United States Patent
Stratico et al.

(10) Patent No.: US 7,370,401 B2
(45) Date of Patent: May 13, 2008

(54) APPARATUS AND METHODS FOR WIRE COIL LEAD PLACEMENT

(75) Inventors: Gianfranco Stratico, Siena (IT); Maurizio Mugelli, Siena (IT)

(73) Assignee: ATOP S.p.A., Florence (IT)

( * ) Notice: Subject to any disclaimer, the term of this patent is extended or adjusted under 35 U.S.C. 154(b) by 320 days.

(21) Appl. No.: 10/817,715

(22) Filed: Apr. 1, 2004

(65) Prior Publication Data

US 2005/0005428 A1  Jan. 13, 2005

Related U.S. Application Data

(60) Provisional application No. 60/460,833, filed on Apr. 3, 2003, provisional application No. 60/462,560, filed on Apr. 11, 2003, provisional application No. 60/515,209, filed on Oct. 27, 2003.

(51) Int. Cl.
 *H02K 15/06* (2006.01)
(52) U.S. Cl. ............... 29/596; 29/732; 29/736; 242/433
(58) Field of Classification Search .......... 29/732–736, 29/596–598, 605–606; 310/215, 254, 42; 242/432.4, 433
See application file for complete search history.

(56) References Cited

U.S. PATENT DOCUMENTS

| | | | |
|---|---|---|---|
| 4,477,966 A | 10/1984 | Napierski | 29/596 |
| 4,512,376 A * | 4/1985 | Barrera | 140/92.1 |
| 4,580,606 A * | 4/1986 | Barrera | 140/92.2 |
| 4,633,575 A * | 1/1987 | Veser | 29/596 |
| 4,723,354 A | 2/1988 | Moser | 29/596 |
| 4,827,601 A * | 5/1989 | Banner | 29/597 |
| 5,065,503 A | 11/1991 | Luciani et al. | 29/735 |
| 5,291,649 A | 3/1994 | Lombardi et al. | 29/596 |
| 5,542,456 A | 8/1996 | Nishimura et al. | 140/92.1 |
| 6,092,276 A * | 7/2000 | Beakes et al. | 29/596 |
| 6,230,388 B1 | 5/2001 | Simon | 29/596 |
| 6,557,238 B1 * | 5/2003 | Becherucci et al. | 29/596 |

FOREIGN PATENT DOCUMENTS

| | | |
|---|---|---|
| JP | 07-059306 | 3/1995 |
| WO | WO 00/55960 | 9/2000 |

* cited by examiner

*Primary Examiner*—Minh Trinh
(74) *Attorney, Agent, or Firm*—Ropes & Gray LLP

(57) ABSTRACT

Apparatus and methods for forming wire coil leads that depart from wire coils inserted into a dynamo-electric machine component are provided. A plurality of wire coils may be received on an insertion tool. A wire lead may be anchored at a location on the insertion tool. A wire coil corresponding to the wire lead may encircle the location in a plane of the insertion tool. In accordance with the present invention, none of the plurality of wire coils may surmount a first portion of the wire lead anchored at the location. In some embodiments, a template for winding the wire coils may be provided that has a seat portion on the underside of the template. The seat portion may receive a wire lead such that the lead is aligned with the anchoring location on the insertion tool.

16 Claims, 30 Drawing Sheets

APPARATUS AND METHODS FOR WIRE COIL LEAD PLACEMENT

This application claims the benefit of U.S. provisional patent application No. 60/460,833, filed Apr. 3, 2003, U.S. provisional patent application No. 60/462,560, filed Apr. 11, 2003, and U.S. provisional patent application No. 60/515,209, filed Oct. 27, 2003, all of which are hereby incorporated by reference herein in their entireties.

BACKGROUND OF THE INVENTION

The present invention relates to the production of dynamo electric machinery components and, more particularly, to apparatus and methods for forming wire leads departing from wire coils. Apparatus and methods of the present invention are applicable to the production of wound stators, in which coils are first placed on an insertion tool during winding on a template, and later inserted into the slots of the stator core.

The aforementioned wire leads are extensions of the coil wire and need to be electrically connected to supplementary wires or terminal points for electric supply to occur. The wire leads are routed along predetermined trajectories, going from the coils to the supplementary wires or terminal points. Solutions of this general nature are described, for example, in Becherucci et al. International patent publication No. WO 00/55960, published Sep. 21, 2000, assigned to Pavesi S. r. L, which is hereby incorporated by reference herein in its entirety.

It would be desirable to provide improved manufacturing operations to form wire leads departing from wire coils.

SUMMARY OF THE INVENTION

In accordance with the present invention, apparatus and methods for wire coil lead placement are provided. Apparatus and methods of the present invention make it possible to route wire leads along optimized trajectories, which occupy less space around the stator core and have more analytical and definable geometrical characteristics. As a consequence, the operations to route the wire leads on such trajectories may be performed by automatic devices, such as those described in commonly-assigned Luciani et al. U.S. Pat. No. 5,065,503, which is hereby incorporated by reference herein in its entirety.

In some embodiments of the present invention, a method for forming wire leads that depart from wire coils inserted into a dynamo-electric machine component may be provided. A plurality of wire coils may be received on an insertion tool. A wire lead may be anchored at a location on the insertion tool. A wire coil corresponding to the wire lead may encircle the location in a plane of the insertion tool, and none of the plurality of wire coils may surmount a first portion of the wire lead anchored at the location.

In some embodiments of the present invention, apparatus for forming wire leads that depart from wire coils inserted into a dynamo-electric machine component may be provided. The apparatus may include a wire winding means for forming a plurality of wire coils. The apparatus may include an insertion tool configured to receive the plurality of wire coils. The apparatus may include an anchoring device disposed on the insertion tool configured to anchor a wire lead. The anchoring device may be disposed such that a wire coil corresponding to the wire lead encircles the wire lead in a plane of the insertion tool, and such that none of the plurality of wire coils surmount a first portion of the wire lead anchored at the anchoring device.

Further features of the invention, its nature and various advantages will be more apparent from the accompanying drawings and the following detailed description.

DETAILED DESCRIPTION OF THE PREFERRED EMBODIMENT

Figure 1:
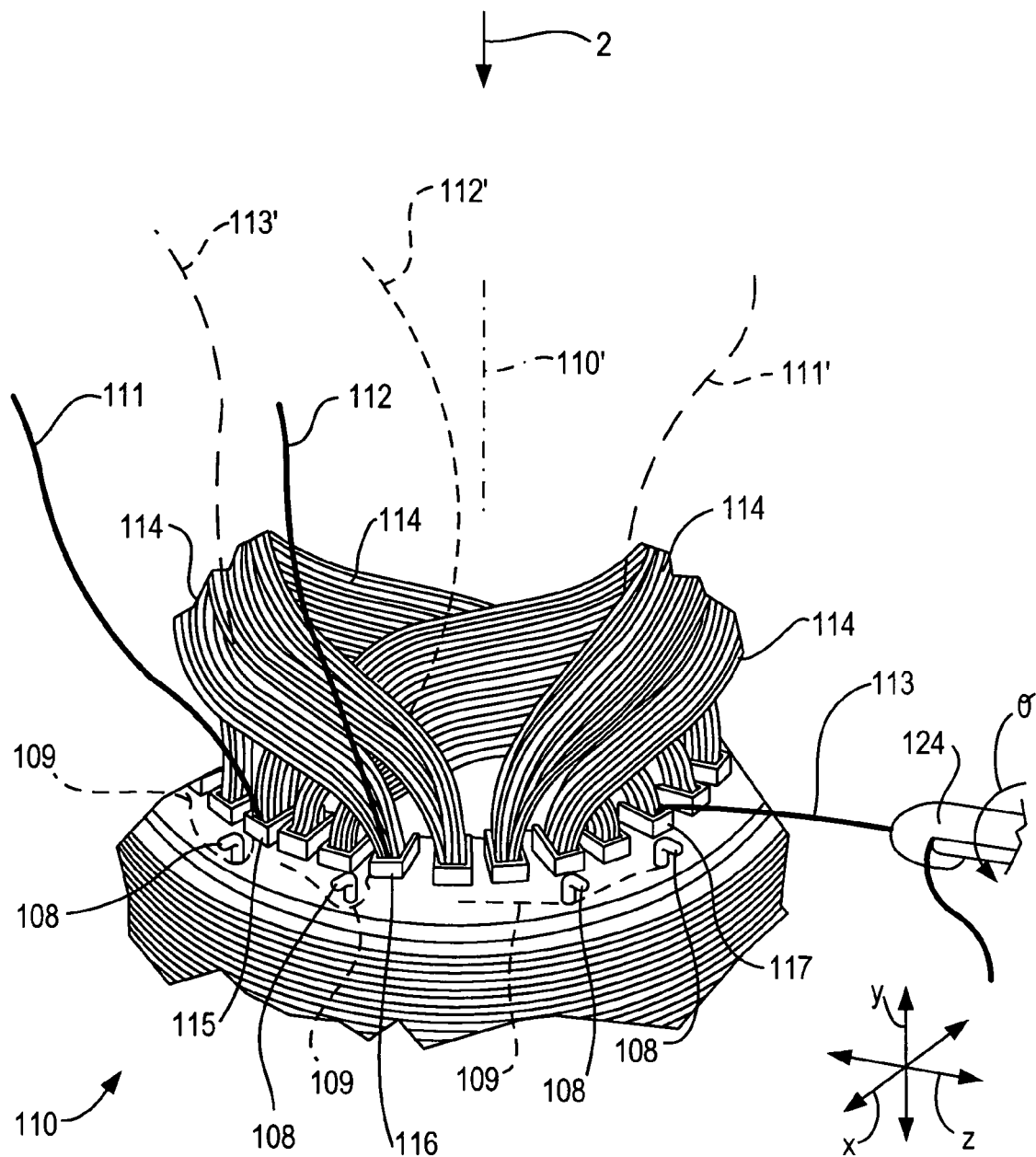
FIG. 1 is a partial perspective view of a wound stator core having wire leads formed as a result of applying the principles of the present invention. (For reasons of clarity, the slots of the stator core of FIG. 1, from where the wire leads depart, may not correspond to those that would be chosen for the electrical scheme.)

With reference to FIG. 1, according to the present invention, wire leads 111, 112, and 113 may be formed so that they are positioned on the outside of stator core 110 and around longitudinal axis 110', which passes through the central bore of the stator core.

In particular, wire leads 111, 112, and 113 are not buried within wire coils 114, but are instead positioned outside of the wire coils with their departure points near the outer portions of slots 115, 116, and 117, as shown in FIG. 1.

As a result, gripper 124, having Cartesian motions x, y, and z and rotational motion θ (around axis z), may freely move to dispose wire leads 111, 112, and 113 on trajectories such as trajectory 109, (illustrated with dashed line representation), extending around pegs 108 placed on the end of stator core 110.

Without using the principles of the present invention, most of the resulting wire leads (see dashed line representations 111', 112', and 113') would stem from their portions buried within wire coils 114. Therefore, wire leads like 111', 112', and 113' would require coursing over the wire coils in order to reach trajectories such as trajectory 109 on stator core 110. Coursing of the wire leads over wire coils 114 involves bearing certain of their portions on the irregular surfaces of the coil turns, which can cause the wire leads to dislodge and consequently lack the drawing tension needed to permanently dispose them on trajectories such as trajectory 109.

Figure 2:
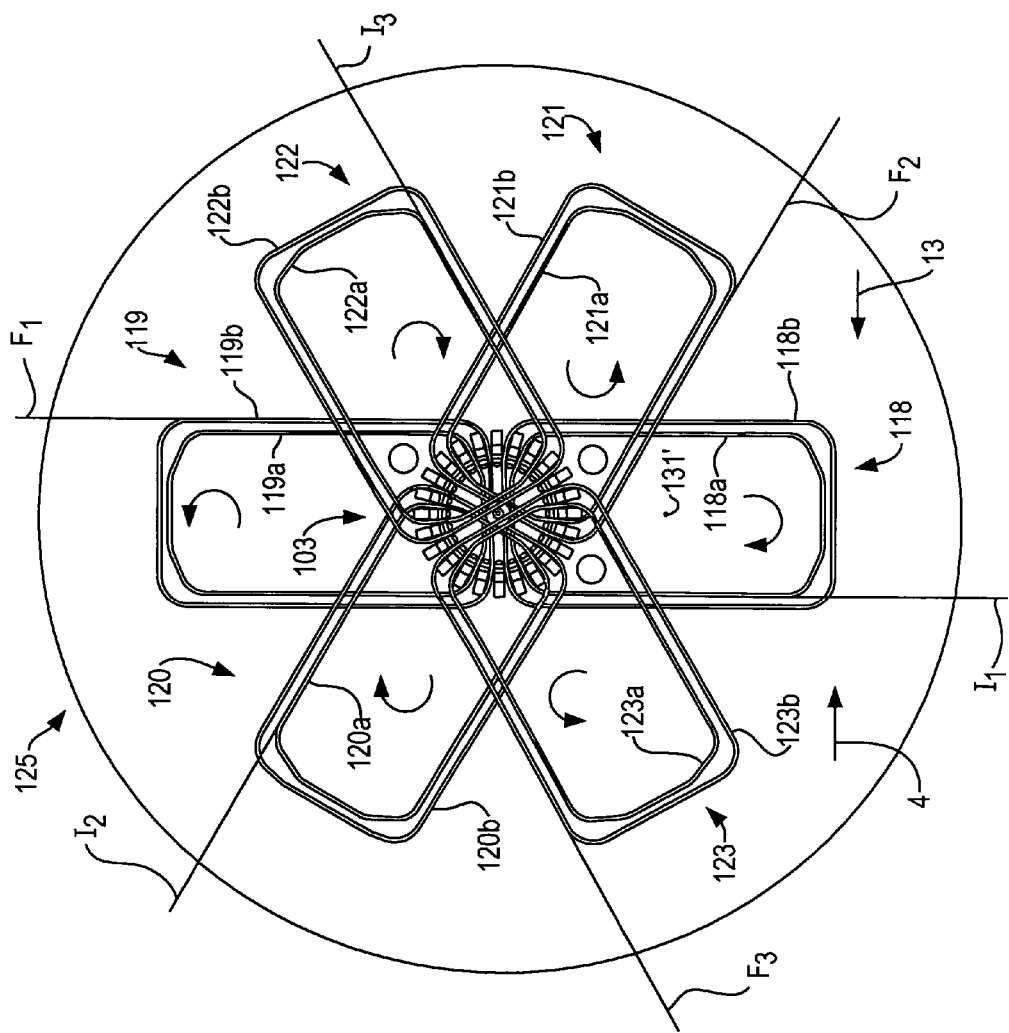
FIG. 2 is a view from direction 2 of FIG. 1, although showing wire coils and related wire leads formed and placed on an insertion tool as is achieved by using operations and devices belonging to the prior art. The electrical scheme that is illustrated in FIG. 2 may also be obtained by adopting the principles of the present invention.

FIG. 2 shows wire coils positioned on an insertion tool 125, such as the insertion tools described in above-mentioned Becherucci et al. International publication No. WO 00/55960, after having wound the wire coils by means of a flyer arm rotating around a template. In particular, the turns of the wire coils have been deposited on insertion tool 125 during and after rotation of the flyer arm around the template.

Insertion tool 125 is provided with a circular array of guide blades 126 (see also FIG. 3), which are concentric and outside a circular array of insertion blades 127. A guide blade of the guide blade array is aligned on the same radius of an insertion blade of the insertion blade array. Equal spacing, such as spacing 130, exists between the various blades. Guide blades 126 have the traditional function of guiding insulation coverings, which need to be placed in the slots of the stator core during insertion operations to insert the various coils in specific slots of the stator core. At the same time, insertion blades 127 guide the coils during the insertion operation to guarantee passage of the same into the stator core slots (contemporarily aligned with the guide blades and the insertion blades).

The electrical scheme of the coils shown in FIG. 2 is an example of those used in a typical three-phase motor, in which: interconnected coil groups 118 and 119 belong to a first phase, interconnected coil groups 120 and 121 belong to a second phase, and interconnected coil groups 122 and 123 belong to a third phase.

In the example of FIG. 2, each coil group has two coils, see for example coils 118a and 118b of coil group 118, and each coil such as coil 118a or 118b is formed from a predetermined number of wire turns. Typically, a continuous wire stretch exists for transition between a coil such as coil 118a and a successive coil such as coil 118b. Similarly, continuous wire stretches exist for transition between a coil such as coil 118b and a successive and opposite coil such as coil 119a, and also between a coil such as coil 119a and a successive external coil such as coil 119b.

This sort of pattern also follows for the other coils belonging to coil groups 120-123. Consequently, groups of coils 118 and 119 of a phase have an initial wire lead $I_1$, which is the initial stretch of wire of coil 118a, and a final wire lead $F_1$, which is the final stretch of wire of coil 119b. Similarly, groups of coils 120 and 121 of a second phase have initial wire lead $I_2$ and final wire lead $F_2$, and groups of coils 122 and 123 of a third phase have initial wire lead $I_3$ and final wire lead $F_3$.

All the mentioned leads are the result of being cut end portions of the wire used by the flyer arm to wind the coils around the template.

The order with which the coils are wound around the template and stripped from it to be placed on the insertion tool may occur according to a sequence such as, for example: first coil 118a, then coil 118b, then coil 119a and then coil 119b, for the group of coils of the first phase. Then, first coil 120a, then coil 120b, then coil 121a, then coil 121b, for the group of coils of the second phase, and finally, first coil 122a, then coil 122b, then coil 123a, then coil 123b, for the group of coils of the third phase. The arrows shown within the coil groups indicate the angular direction used to course the wire forming the coils.

Each coil such as coils 118a-123b is positioned on insertion tool 125, as a result of being stripped from the template, so that its innermost portion (such as portion 118a' of coil 118a, see FIG. 3) spans around predetermined guide blades and insertion blades. For example, coil 118a spans between guide blades 126a and 126e (see FIG. 3) as a result of aligning these blades with the template during winding and stripping off of the turns of coil 118a from the template.

The template can be permanently aligned with the position where coils 118a and 118b are temporarily shown in FIG. 2. The insertion tool may be indexed around centre 125' in order to sequentially align the template with further guide blades which will have coils span around them, as shown in FIGS. 2 and 3

Figure 3:
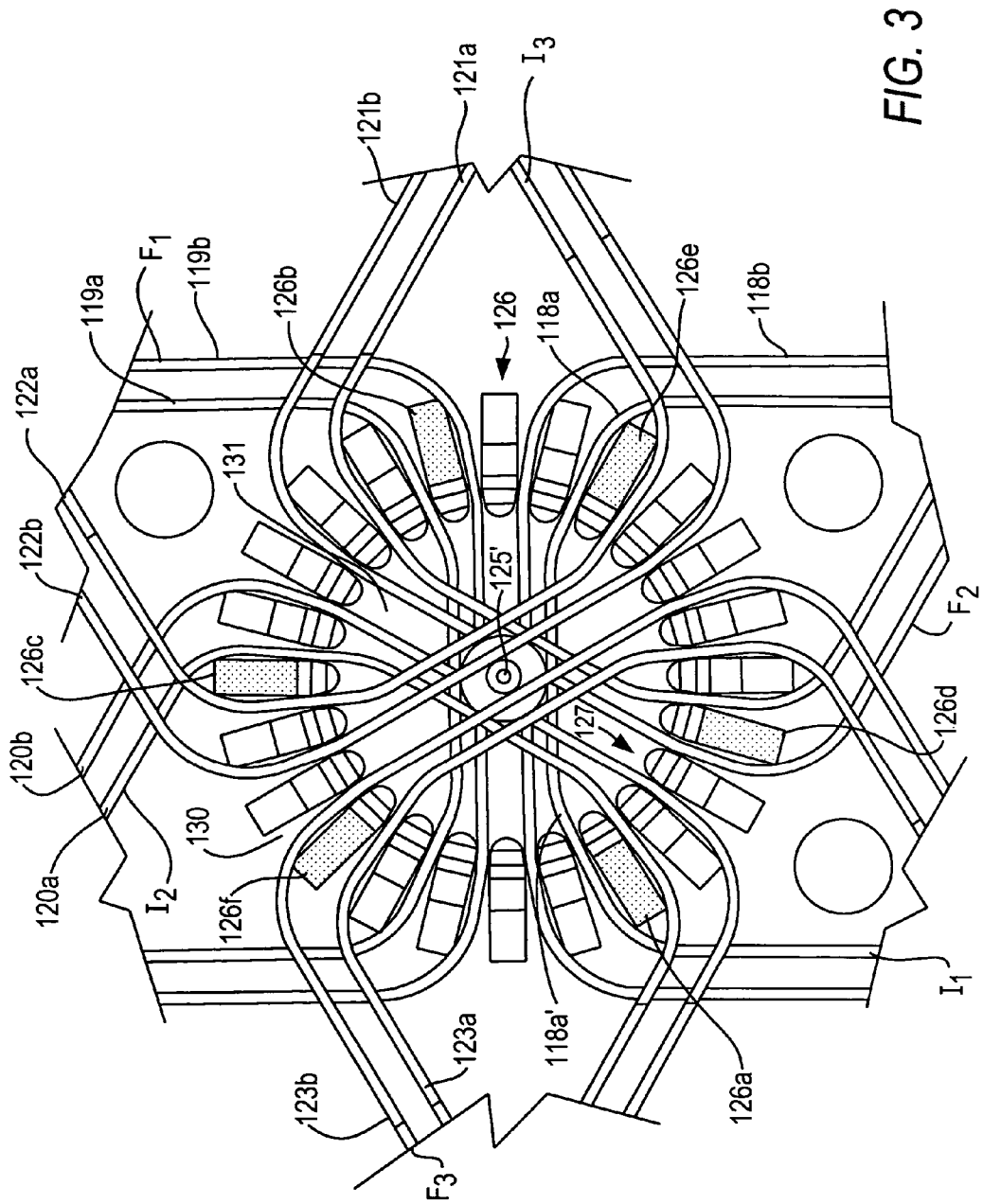
FIG. 3 is an enlarged view of central area 103 of FIG. 2.

When all the coils have been placed on the insertion tool, as shown in FIGS. 2 and 3, the insertion tool is transferred to an insertion station, where a stator core is placed over the guide blades so that the slots of the stator core are aligned with specific guide blades and insertion blades for receiving the coils which span around them. In practice, each slot of the stator core has to be aligned with a specific spacing, such as spacing 130, which acts as a guide corridor along which a branch of a coil runs during the insertion operation. The insertion operation progresses by passing a ram through central area 131, delimited by the insertion blades. The ram is moved towards the viewer observing FIG. 3, all the way through the stator core, which is aligned overhead. During the movement of the ram, branches of the coils run along the guide blades and the insertion blades (e.g., along spacing such as spacing 30) in order to become aligned and pushed through the openings of the stator core slots. Consequently, the coils pass from being in the horizontal orientation of FIGS. 2 and 3 to the vertical orientation of FIG. 1. In the vertical orientation, the underside of the coils, when in the previous horizontal orientation, will be facing longitudinal axis 110', while the wire leads will extend beneath the stator core (in a condition represented by a 180° topple rotation of the stator core shown in FIG. 1).

As shown in FIGS. 2 and 3, portions of the coils surmount each other. Thus, and according to prior art processing methods, wire leads such as leads $I_1$, $I_2$, $I_3$, $F_1$, and $F_2$ will be surmounted by portions of coils which have been stripped from the template, after forming these same wire leads. As a result of the successive insertion of the coils into the slots of the stator core, wire leads $I_1$, $I_2$, $I_3$, $F_1$, and $F_2$ will be buried in the coils, just like wire leads 111', 112', and 113', shown in FIG. 1. Wire lead $F_3$ will not be buried in the coils like 111', 112', and 113', however, because it is formed after winding all coils, and therefore would be placed above them.

As will be more fully described in the following, the present invention achieves that wire leads such as leads $I_1$, $I_2$, $I_3$, $F_1$, and $F_2$, which would be buried in the coils when using prior art methods, are instead positioned like leads 111, 112, and 113 shown in FIG. 1.

In accordance with the present invention, wire leads such as leads $I_1$, $I_2$, $I_3$, $F_1$, and $F_2$ are prepared prior to insertion of the coils in the stator core, so that they do not have certain portions of their extension surmounted by any coil portions that become placed on the insertion tool and which would otherwise bury them later as a result of the insertion operations.

Furthermore, in accordance with the present invention, such unburied portions of the wire leads need to be positioned around centre 125' of the insertion tool, and in a manner that they will be encircled by any of those coil portions which would bury them later as a result of the insertion operations. Consequently, the resulting portions of the wire leads, which are not buried under any of the coils, can be grasped and pulled until remaining portions of these same wire leads can be withdrawn from being buried.

The end result is that the wire leads can be like leads 111, 112, and 113, shown in FIG. 1.

FIGS. 4-14 show operational sequences performed in accordance with the present invention, prior to insertion operations, so that leads like leads 111, 112, and 113 may be formed. The operational sequences involve winding stages of coils like those shown in FIG. 2, and also their transfer to insertion tool 125 in order to span the front portion of the coils around the guide blades according to the illustration of FIG. 3.

With reference to FIGS. 4-13, an initial lead such as lead $I_1$, $I_2$, or $I_3$ may be formed from the extension of wire W spanning between flyer arm 131 and lead holder 132, before actually winding the turns of the coils around template 133.

Operational sequences will now be described to show how wire leads like $I_1$ may be formed in accordance with the present invention. In particular, the operational sequences will relate to the formation of lead $I_1$ belonging to coil 118a. It should be appreciated that similar operational sequences can be used to form other wire leads in accordance with the present invention.

Figure 4:
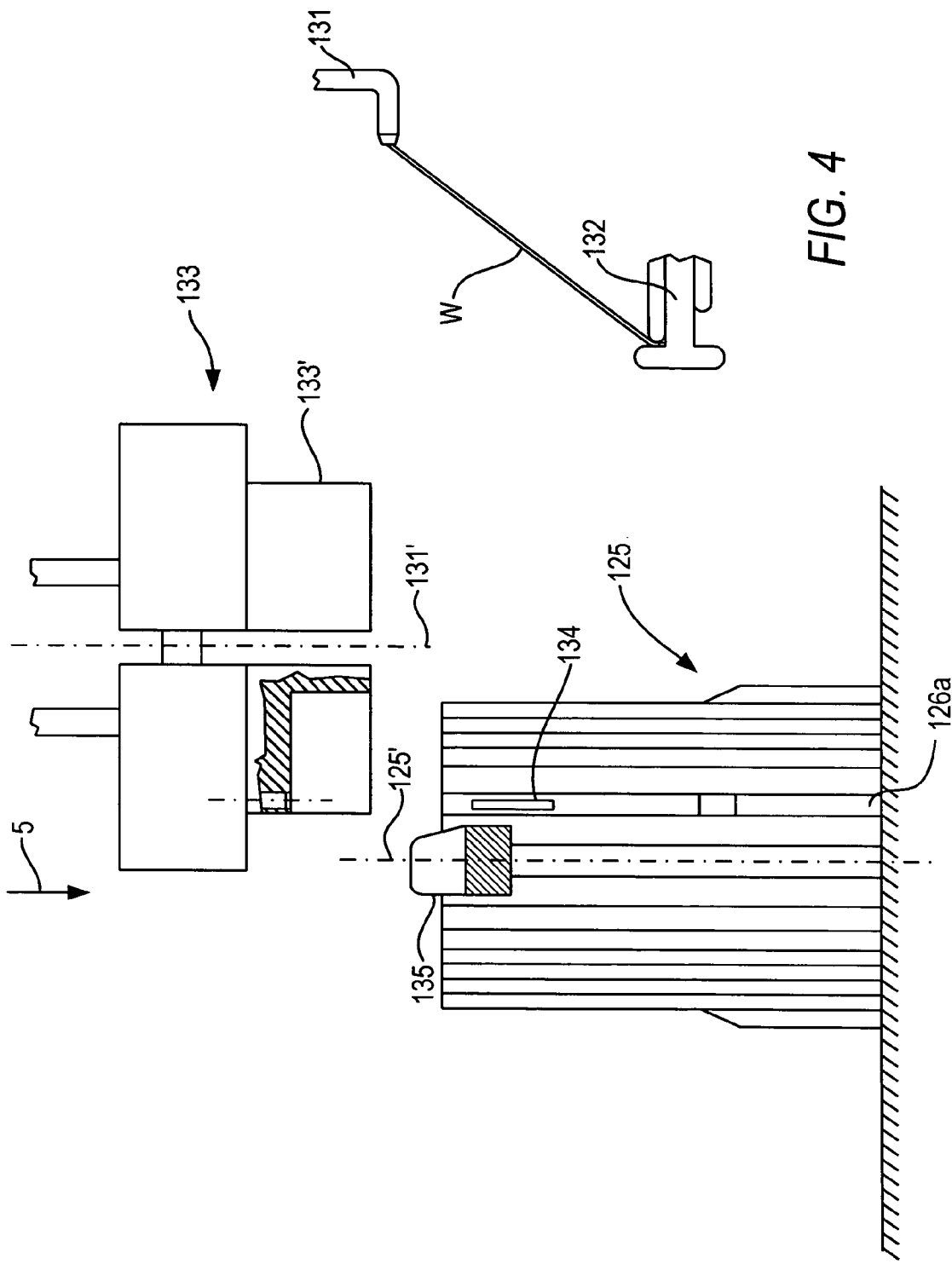
FIG. 4 is a schematic view, as seen from direction 4 of FIG. 2, showing devices performing an operational sequence according to the principles of the present invention.
Figure 5:
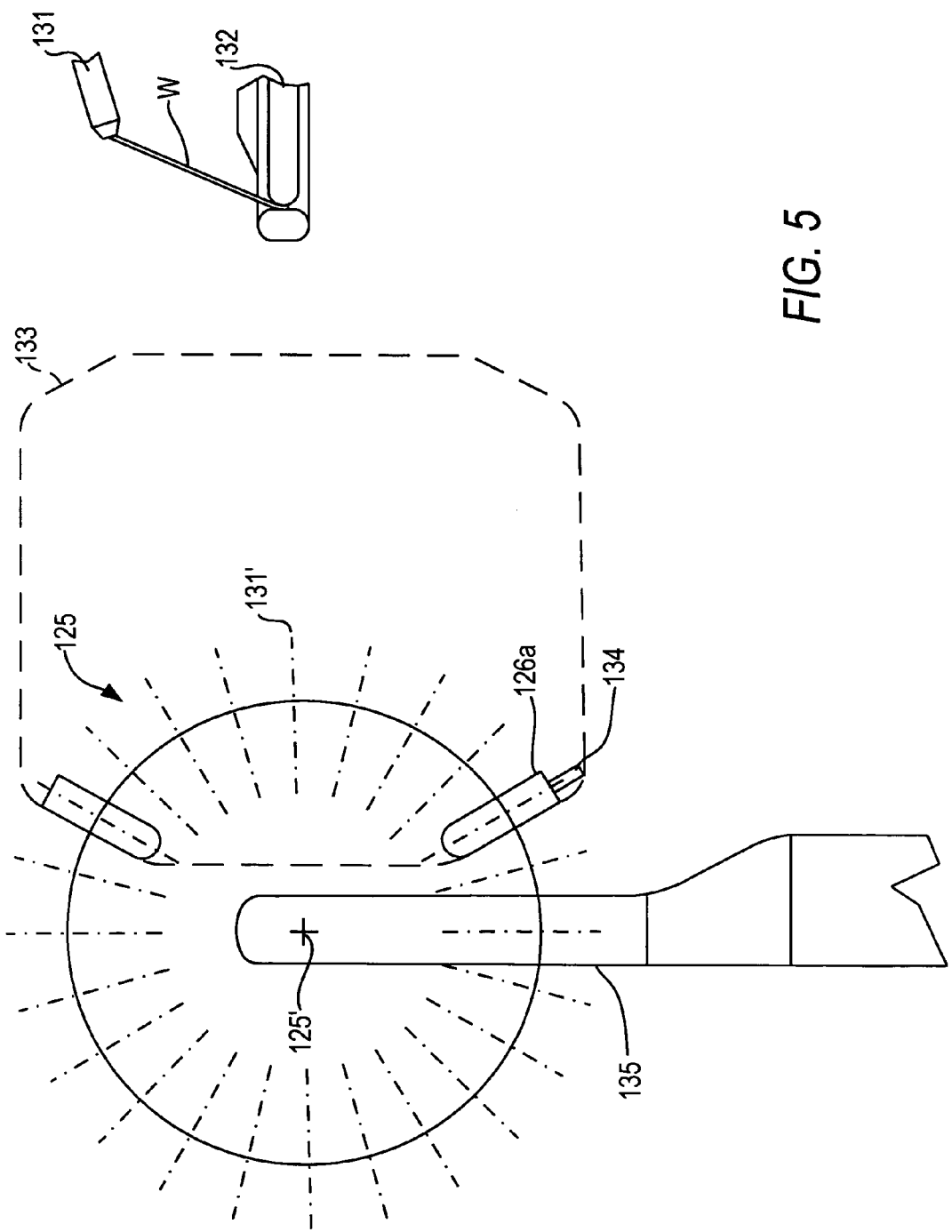
FIG. 5 is a schematic view from direction 5 of FIG. 4 without showing certain parts of FIG. 4 for reasons of clarity.

FIGS. 4 and 5 show flyer arm 131 ready to rotate around axis 131' in order to wind turns of coil 118a around step 133' of template 133. Template 133 is centered on axis 131' (also shown in FIG. 2), and is in an upward rest position, as is required in stages between winding the various coils.

In accordance with the present invention, a limited portion of wire W, which is used to form the wire lead, may be temporarily engaged in a respective anchoring device 134 of one of guide bars 126 (in the case of lead $I_1$, guide bar 126a is chosen for reason to be explained in the following). The anchoring devices are positioned on the upper most portion of the guide bars. Amongst the various guide bars existing on insertion tool 125, the guide bars which should temporarily anchor the wire lead may be the guide bars (shaded in FIG. 3) around which the wire lead are routed to enter the coil to which it belongs. This guide bar is one of the guide bars around which the coil needs to span when positioned on the insertion tool. Therefore, and with reference to FIG. 3, wire lead $I_1$ may be temporarily anchored to guide bar 126a, wire lead $F_1$ may be temporarily anchored to guide bar 126b, wire lead $I_2$ may be temporarily anchored to guide bar 126c, wire lead $F_2$ may be temporarily anchored to guide bar 126d, wire lead $I_3$ may be temporarily anchored to guide bar 126e, and wire lead $F_3$ may be temporarily anchored to guide bar 126f.

Furthermore, the choice of which guide bar should temporarily anchor the wire leads needs to respect the condition mentioned previously (i.e., the wire leads need to be positioned around center 125' of the insertion tool, and in a manner that they will be encircled by any of those coil portions which would bury the wire leads later as a result of the insertion operations). Therefore, and with reference to the electrical scheme shown in FIGS. 2 and 3, anchoring of wire lead $I_1$ to guide bar 126a obtains that coils 118a, 118b, 120a, 120b, 123a and 123b encircle portion of wire lead $I_1$ anchored to guide bar 126a; anchoring portion of wire lead $F_1$ to guide bar 126b obtains that coils 119b, 121a, 121b, 122a and 122b encircle portion of wire lead $F_1$ anchored to guide bar 126b; anchoring portion of wire lead $I_2$ to guide bar 126c obtains that coils 120a, 120b, 122a, and 122b encircle portion of wire lead $I_2$ anchored to guide bar 126c; anchoring portion of wire lead $F_2$ to guide bar 126d obtains that coils 121b, 123a, and 123b encircle portion of wire lead $F_2$ anchored to guide bar 126d; anchoring portion of wire lead $I_3$ to guide bar 126e obtains that coils 122a, and 122b, 118 encircle portion of wire lead $I_3$ anchored to guide bar 126e.

Figure 6:
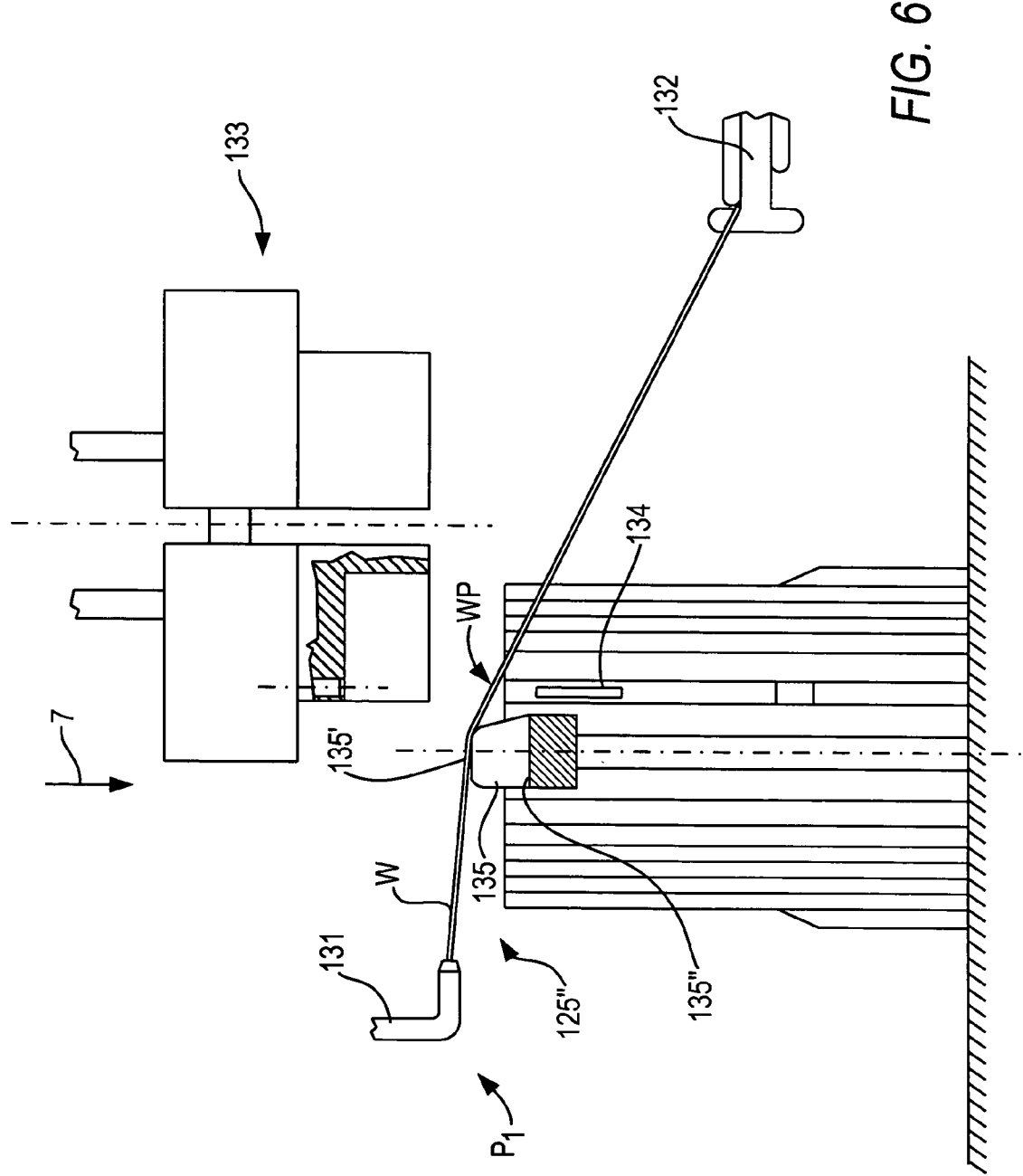
FIG. 6 is a view similar to FIG. 4, although showing a different operational sequence, according to the principles of the present invention.
Figure 7:
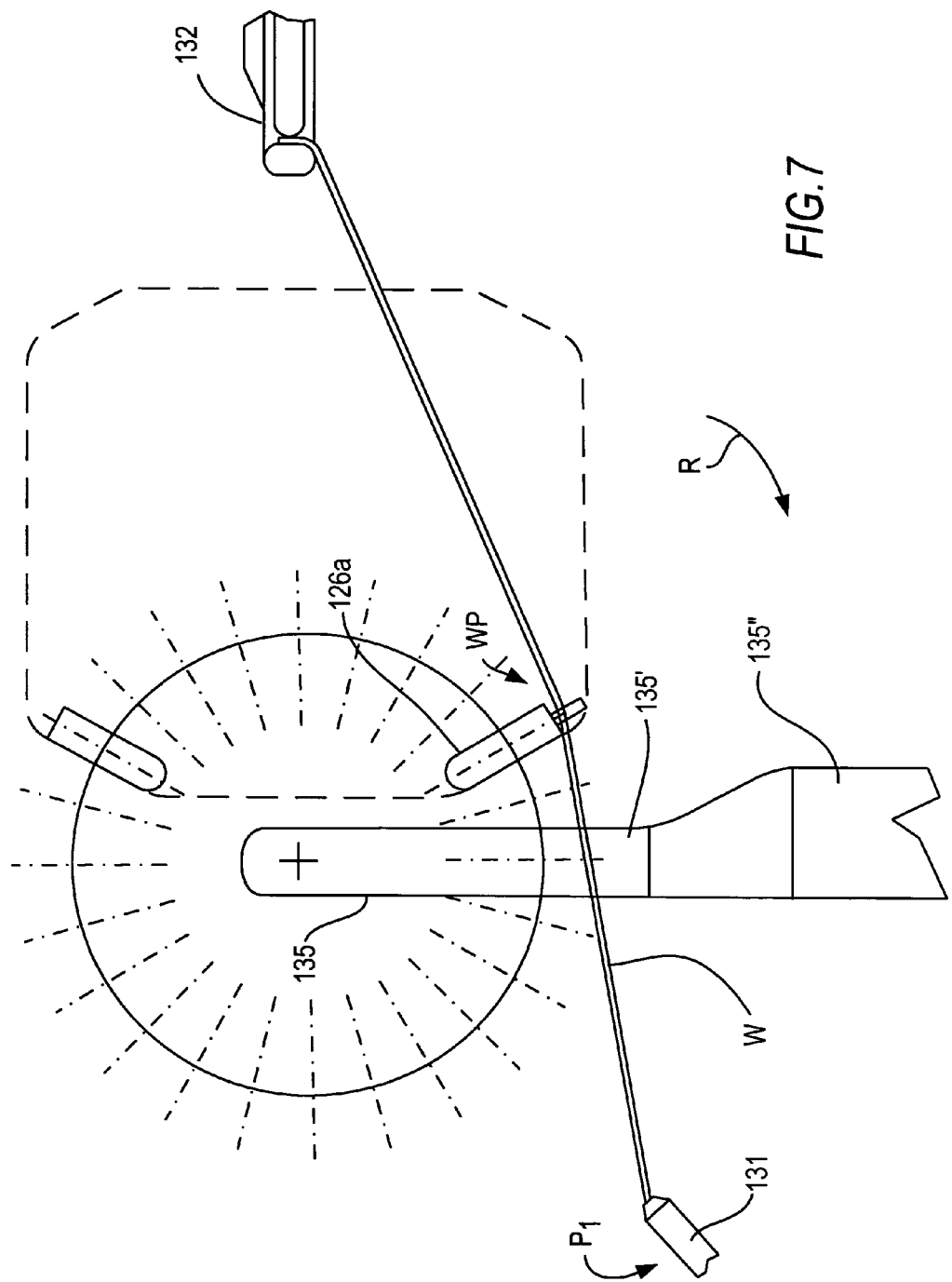
FIG. 7 is a view from direction 7 of FIG. 6 without showing certain parts of FIG. 6 for reasons of clarity.

Continuing with the operational sequences, FIGS. 6 and 7 illustrate the phase in which flyer arm 131 has rotated in direction R around axis 131' to reach position $P_1$, in order to place wire portion WP of wire W in alignment with temporary anchoring device 134 of guide bar 126a. Deflector member 135 is used to raise wire W above portion 125" of insertion tool 125. Deflector member 135 is configured to have two different levels 135' (superior level over insertion tool 125) and 135" (lower level outside the array of guide blades of insertion tool 125), so that rotation of the flyer arm around the template is not obstructed.

Figure 8:
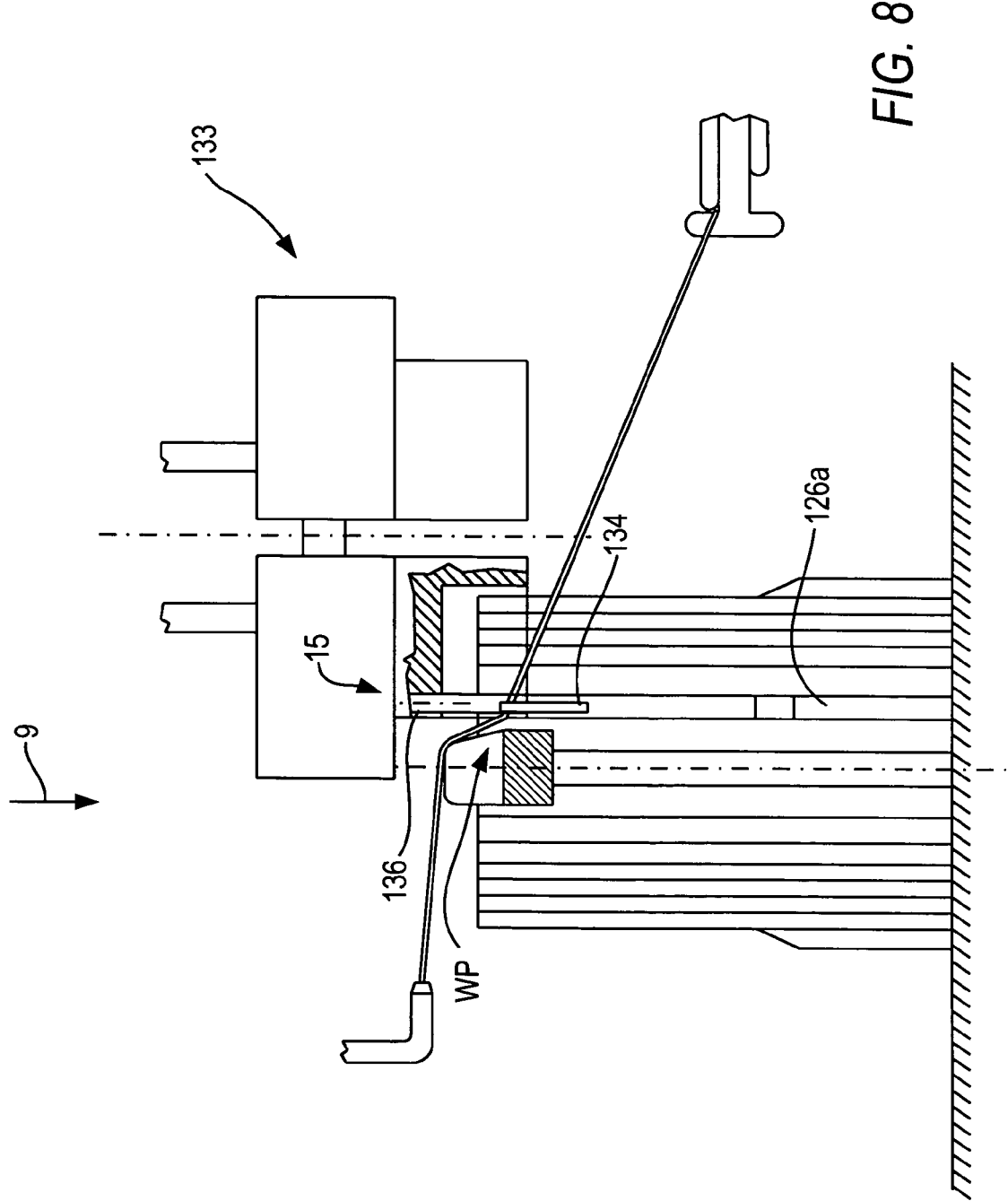
FIG. 8 is a view similar to FIG. 4, although showing a different operational sequence, according to the principles of the present invention.
Figure 9:
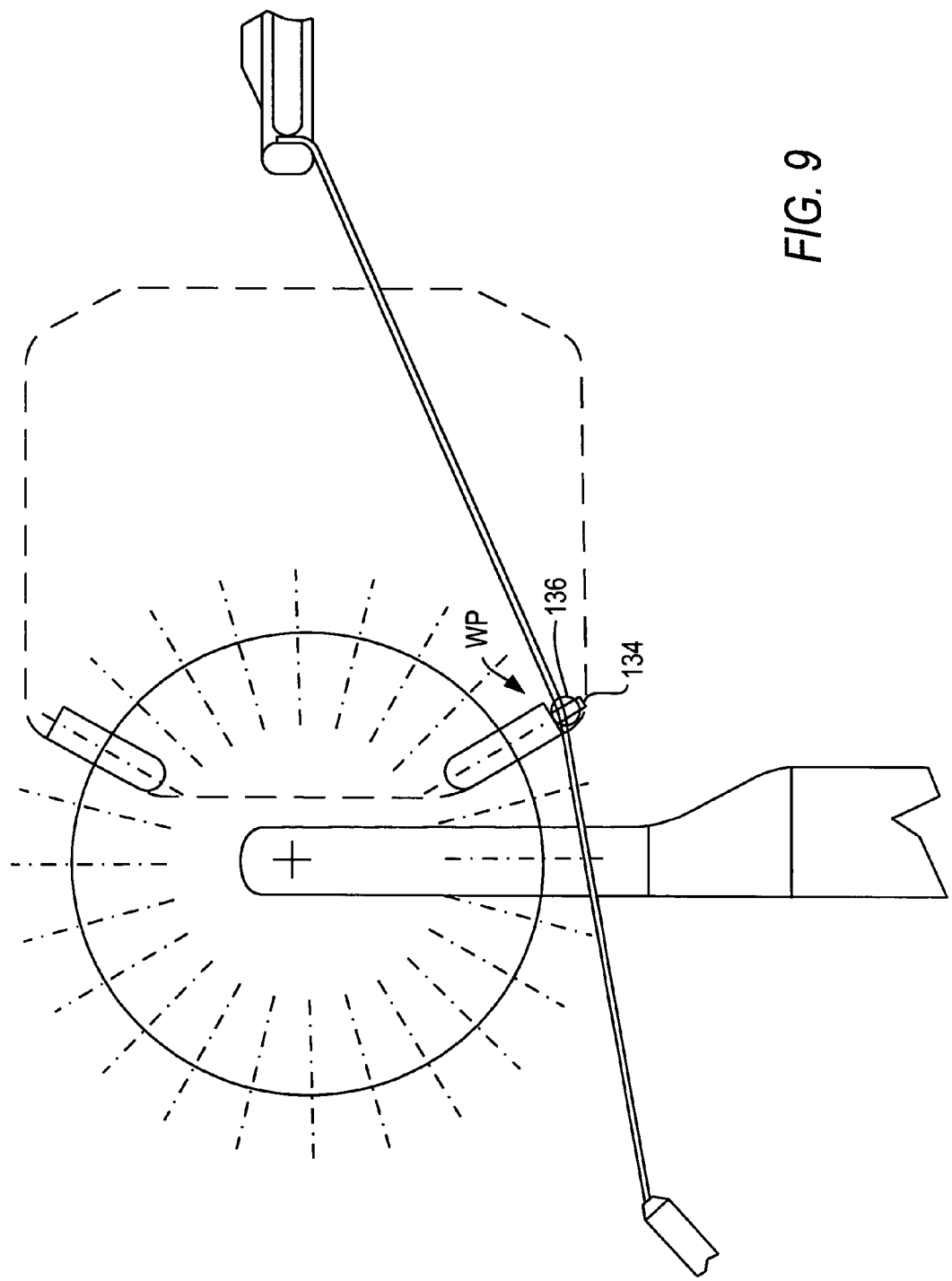
FIG. 9 is a view from direction 9 of FIG. 8 without showing certain parts of FIG. 8 for reasons of clarity.

FIGS. 8 and 9 illustrate a successive phase in which template 133 has descended to receive certain guide blade portions (shown transparent), as is required to start winding. Furthermore, insertion pin 136 has descended from template 133 to place wire portion WP in anchoring device 134. After placement of wire portion WP in the anchoring device, deflector member 125 may be retracted, and flyer arm 131 may continue rotation in direction R to wind coil 118a. After a few turns of coil 118a have been formed, lead holder 132 may release the portion of the wire lead which it is holding.

Figure 10:
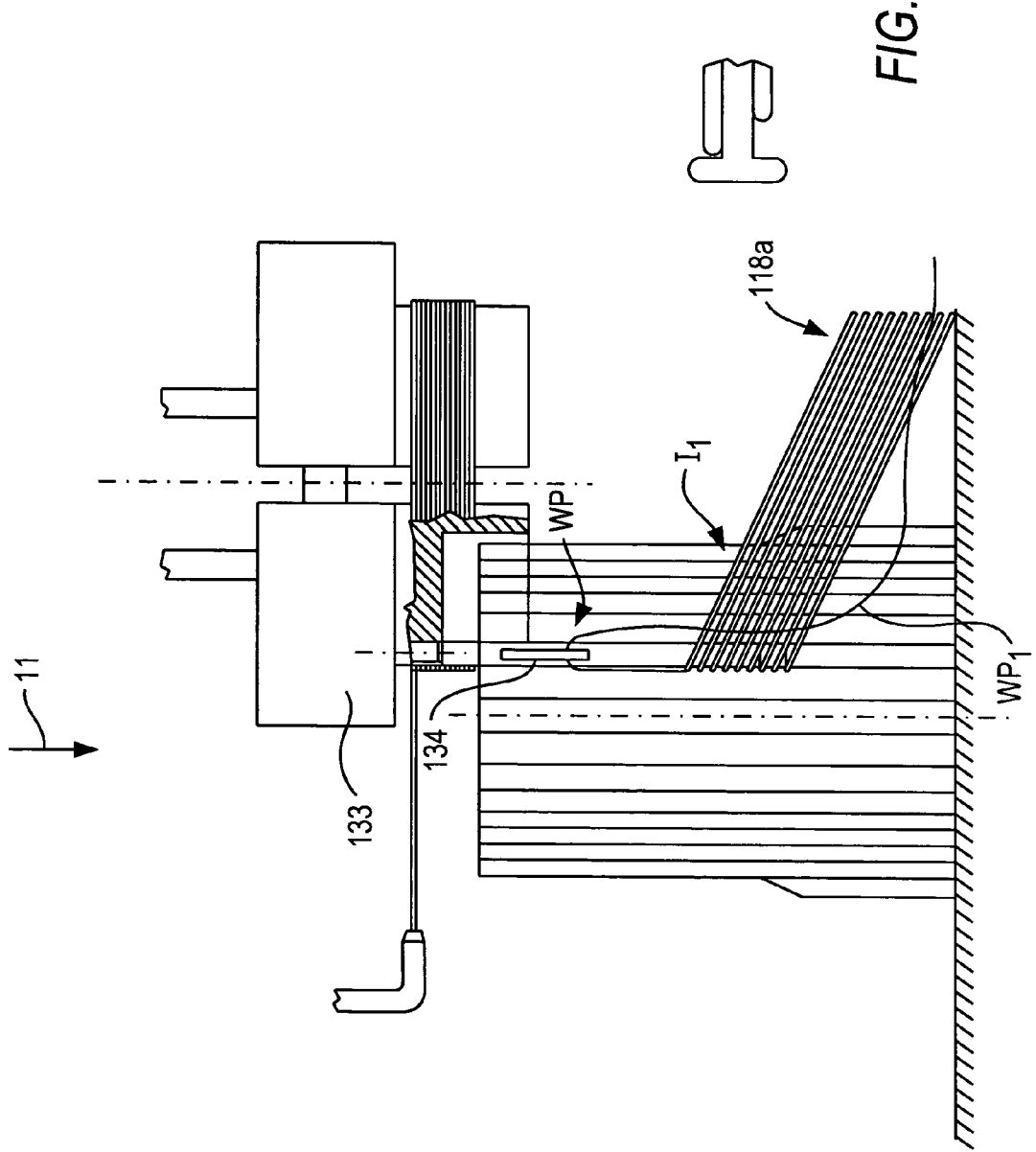
FIG. 10 is a view similar to FIG. 4, although showing a different operational sequence, according to the principles of the present invention.
Figure 11:
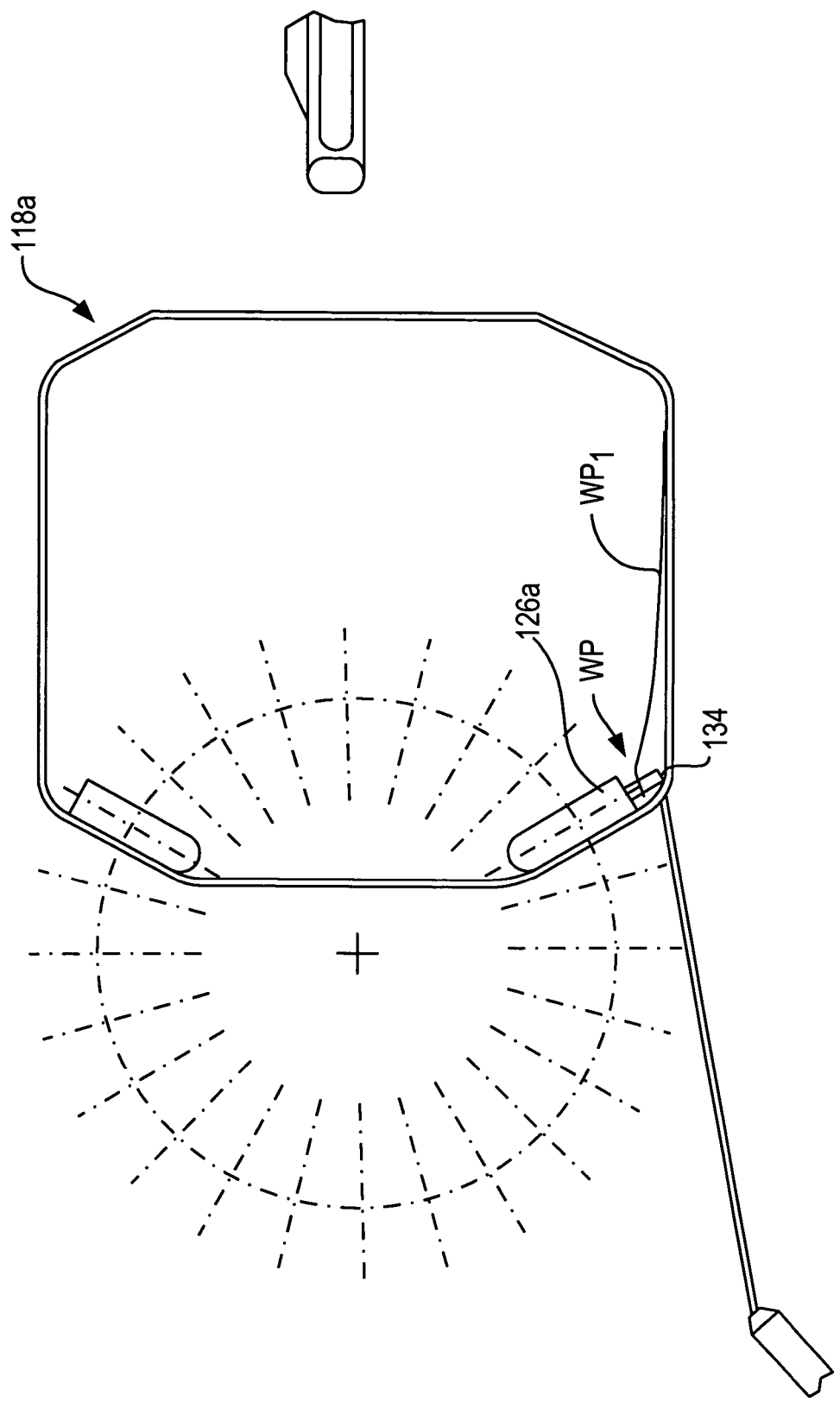
FIG. 11 is a view from direction 11 of FIG. 10 without showing certain parts of FIG. 10 for reasons of clarity.

FIGS. 10 and 11 illustrate an even further phase in accordance with the present invention in which a significant number of turns of coil 118a have been wound, and are in the process of descending along the guide bars partially received in the template. Portion $WP_1$ of lead $I_1$ is being buried by turns, while portion WP is maintained in anchoring device 134 so that it is free from being buried.

Figure 12:
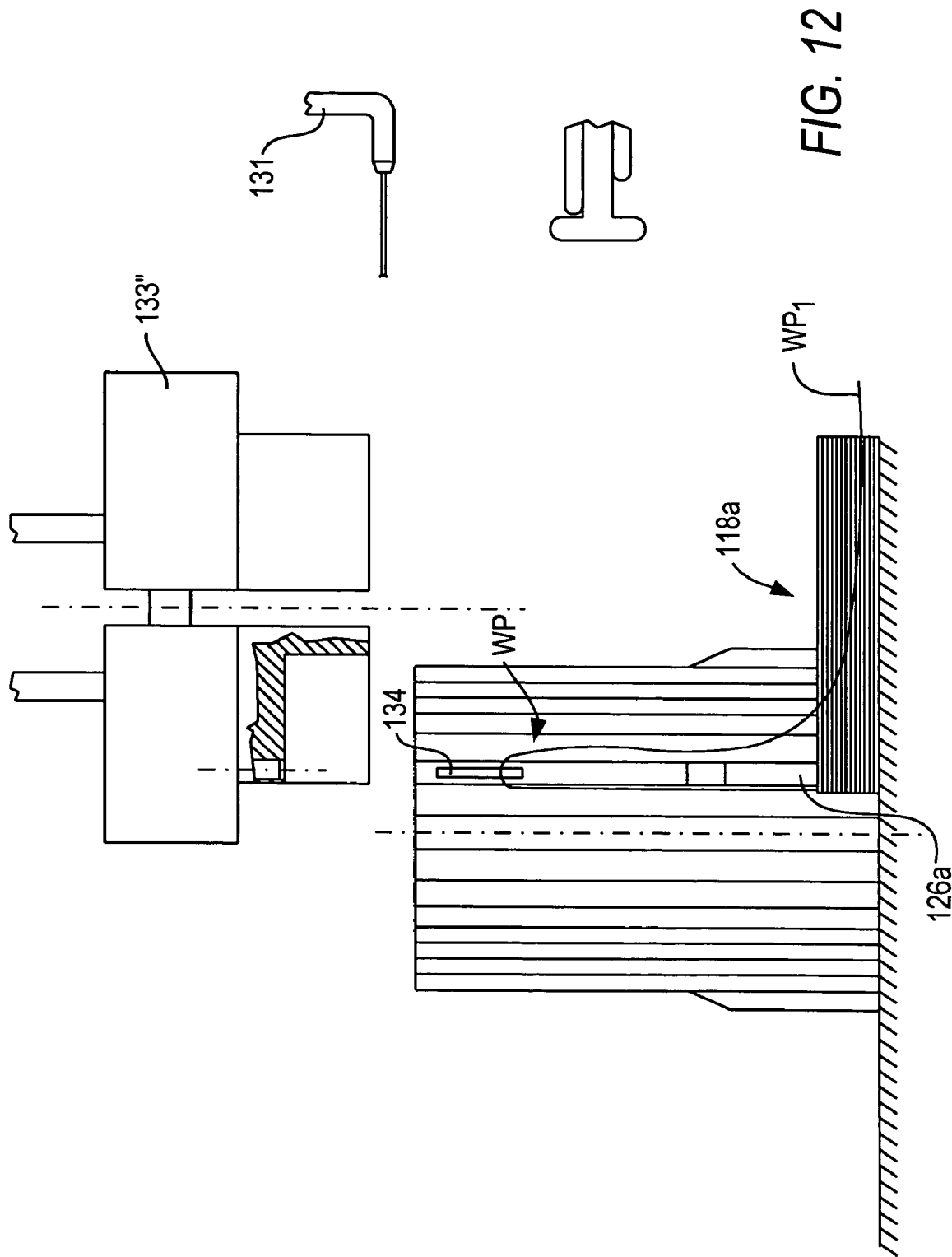
FIG. 12 is similar to FIG. 4, although showing a different operational sequence according to the principles of the present invention.

FIG. 12 shows coil 118a completely formed and stripped off the template, while portion WP is maintained in anchoring device 134. Flyer arm 131 is ready to wind a successive coil like 119b around step 133" of template 133.

Figure 13:
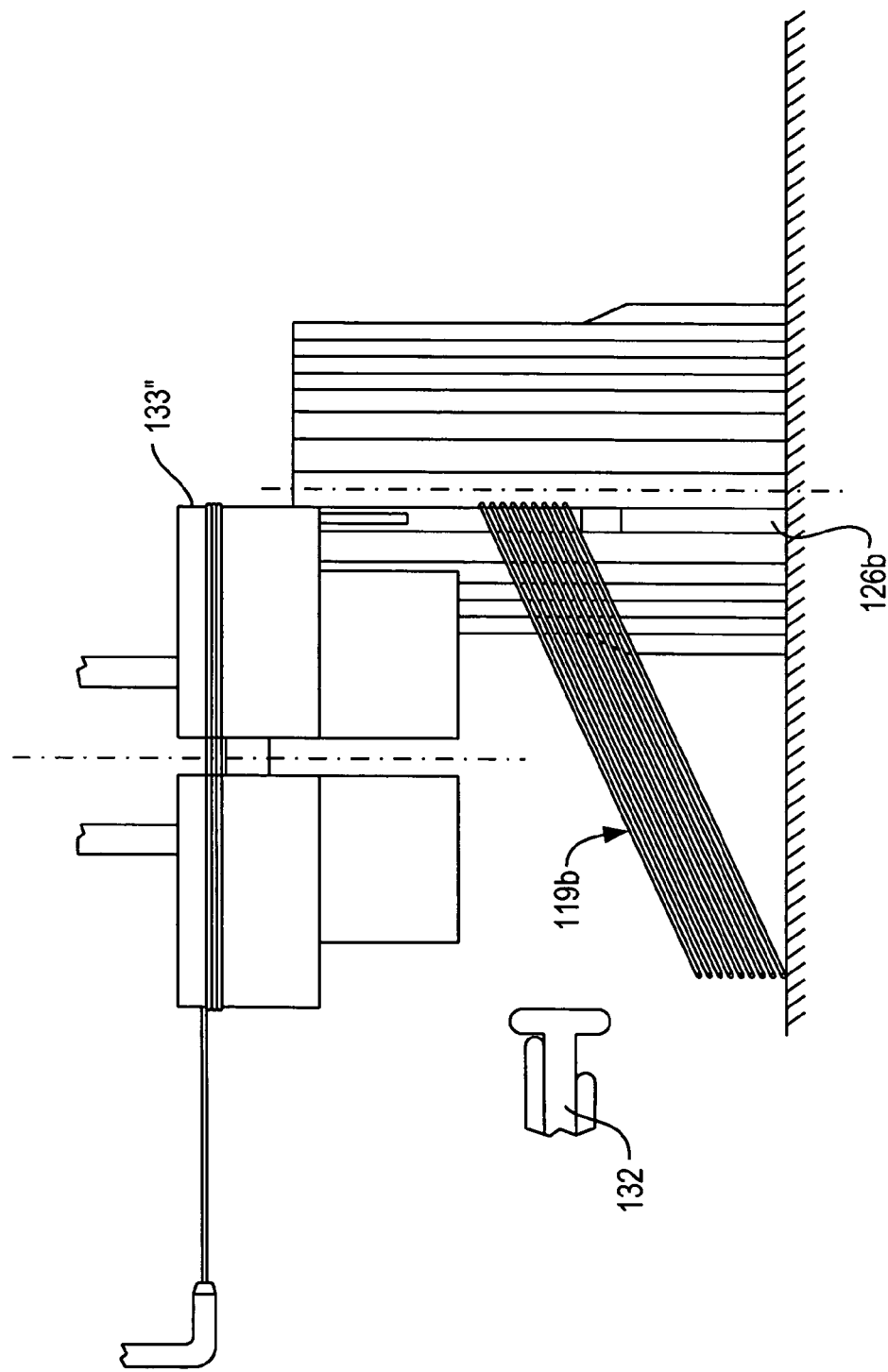
FIG. 13 is a view similar to FIG. 4, although showing a different operational sequence according to the principles of the present invention.
Figure 14:
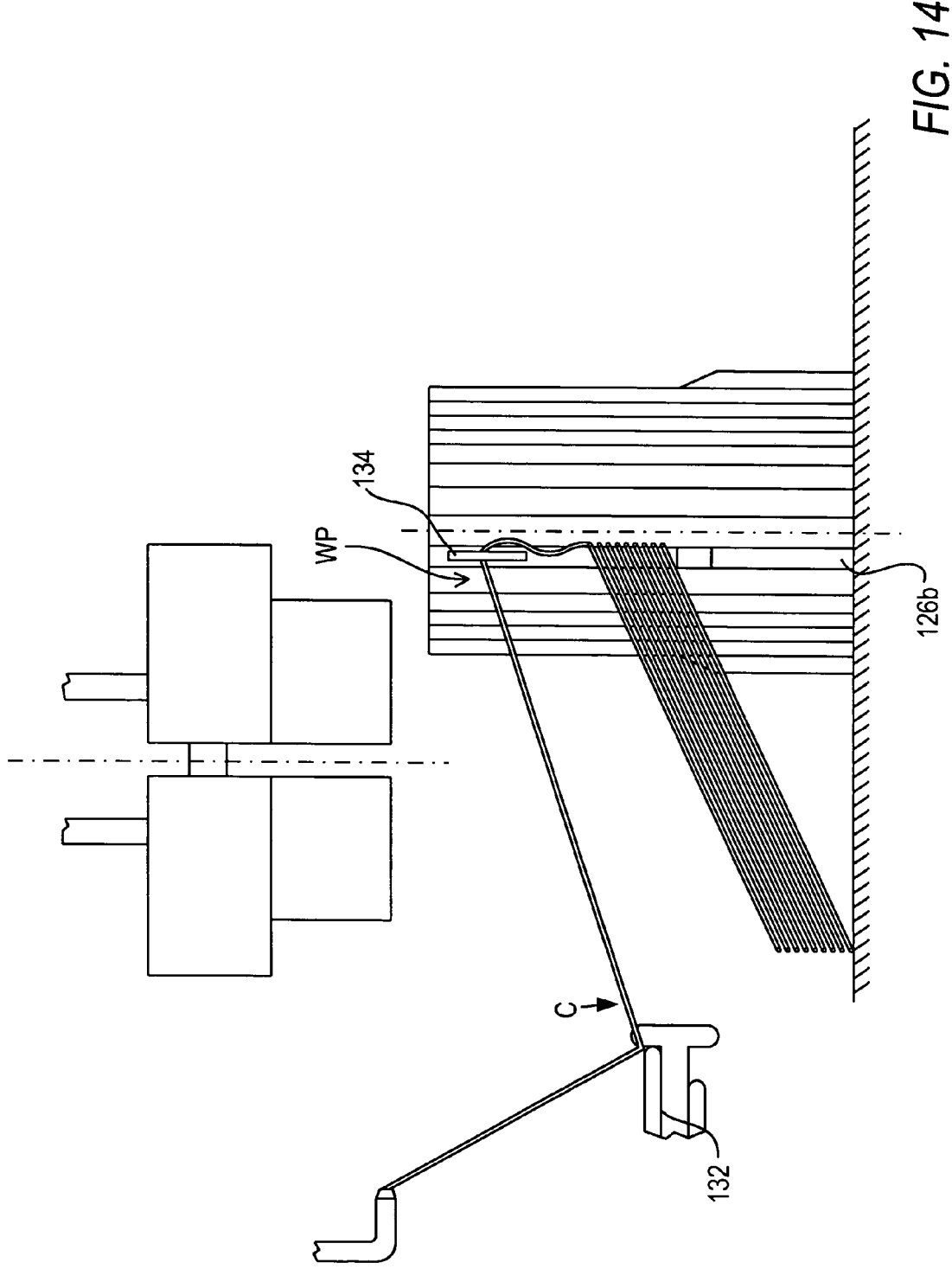
FIG. 14 is a view similar to FIG. 13, although showing a different operational sequence according to the principles of the present invention.

FIGS. 13 and 14 show the operational sequences to form a final lead like $F_1$ on the opposite side of the template. For reasons of clarity, coil 118a, which has been wound and placed on the insertion tool prior to winding coil 118b, has been omitted.

With reference to FIG. 13, coil 119b is finished and certain turns of step 133" need to be stripped from template 133. Once this has been done, lead holder 132 may grasp wire W and move to place portion WP in anchoring device 134 of guide bar 126b (see FIG. 14). After the instant shown in FIG. 14, a cutter (not shown) belonging to lead holder 132 may cut the wire W in a location such as location C to allow index of the insertion tool, as is required to proceed with winding of coil such as coil 120a. A deflector member like 135 is not required for the formation of a wire lead like $F_1$ because rotation of the flyer will be counterclockwise around the template.

The operational sequences in accordance with the present invention described with reference to FIGS. 4-14 to form wire leads $I_1$ and $F_1$ may be repeated to form the other initial and final wire leads that need to be anchored to guide bars 126.

Insertion tool 125 needs to be indexed around center 125'. Therefore, insertion tool 125 is shifted, or moved, with respect to the fixed position of flyer arm 131 and template 133, in periods between winding of angularly spaced coils, in order to align with the template the position of the guide blades where a coil needs to be placed on the insertion tool.

Figure 15:
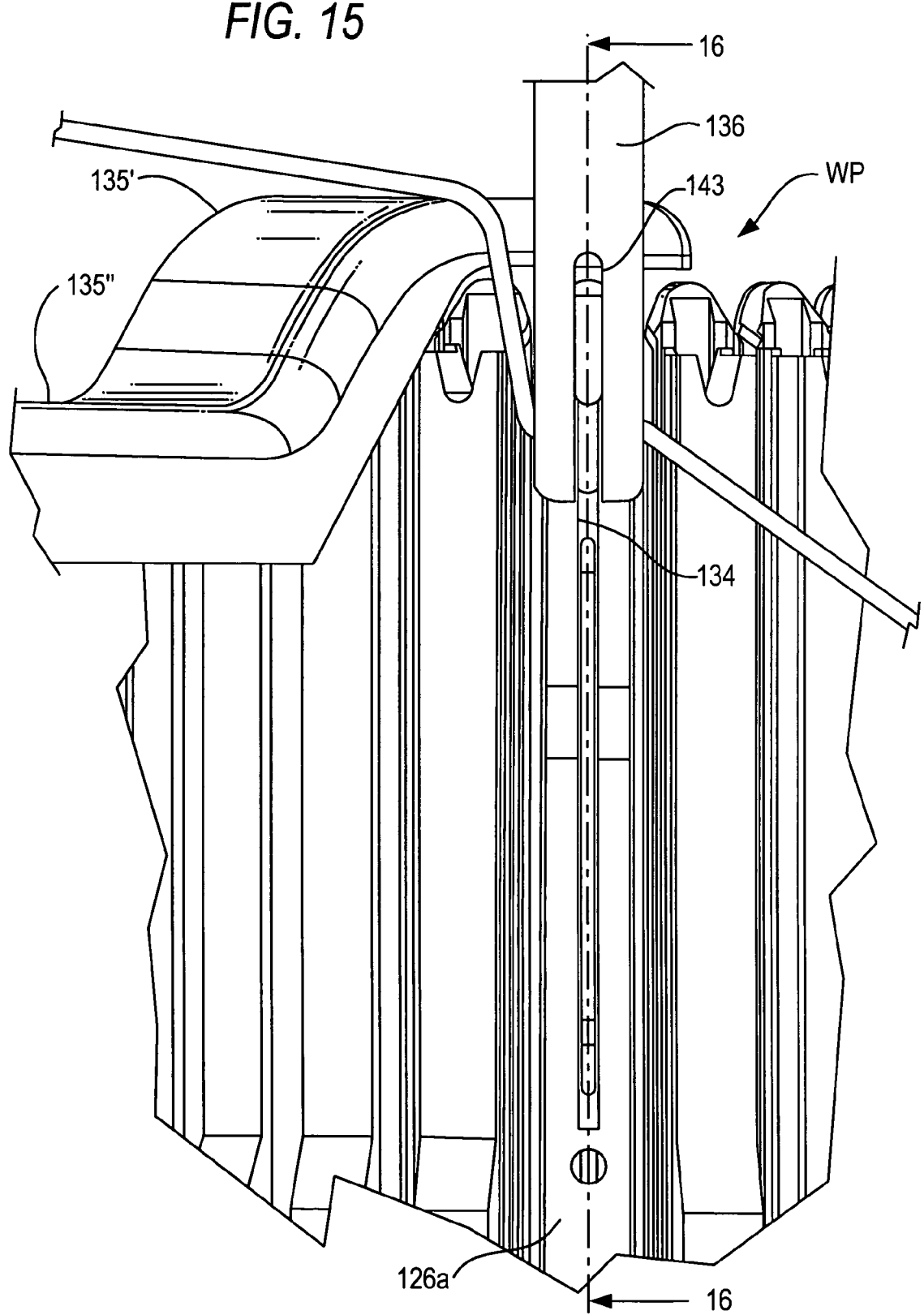
FIG. 15 is a partial view of area 15 indicated in FIG. 8.
Figure 16:
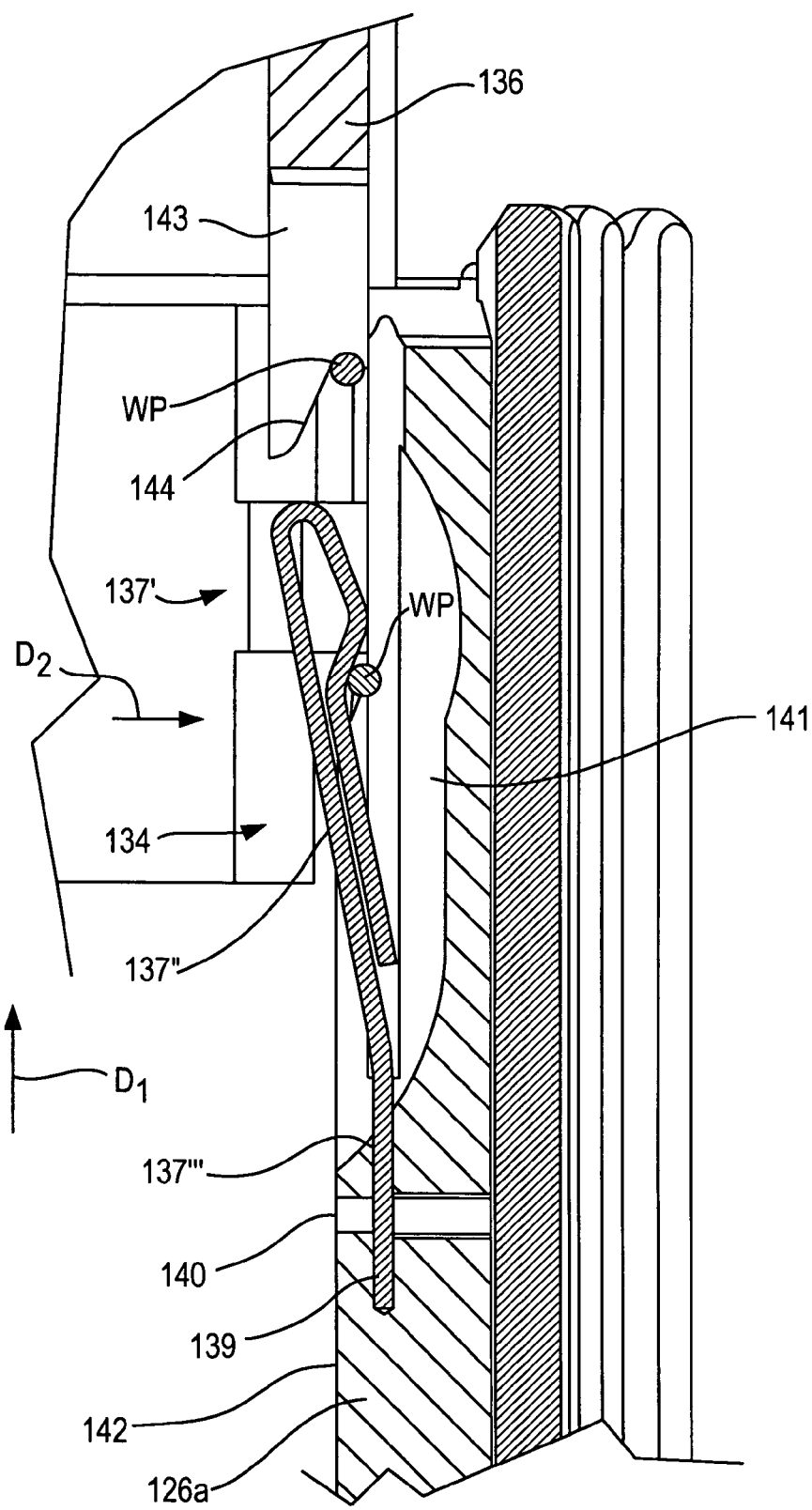
FIG. 16 is a sectional view from direction 16-16 of FIG. 15, although omitting certain parts of FIG. 15, and showing others in different operational position with respect to their condition in FIG. 15.

FIGS. 15 and 16 illustrate the constructional details of insertion pin 136 and anchoring device like 134. Anchoring device 134 may be configured like an upstanding flexible post, manufactured by bending a rod according to the configuration shown in FIG. 16. Upper enlarged portion 137' of anchoring device 134 acts as a gate which withholds wire portion WP from exiting in direction $D_1$. Central portion 137" joins upper enlarged portion to bottom portion 137''', which is inserted in a slit 139 of a guide bar such as guide bar 126a. Bottom portion 137''' may be anchored in slit 139 by, for example, the pressure of a pin (not shown) forced into bore 140. Bore 140 communicates with, and is transverse to, slit 139.

Slot 141 of guide bar 126a is capable of fully receiving upper enlarged portion 137' and central portion 137" when an external force from a direction like $D_2$ is applied to anchoring device 134. Preferably, this results in there being no obstruction along surface 142 of guide bar 126a when portions of the coils are there running in direction $D_1$ to be inserted in the slots of the stator core.

FIGS. 15 and 16 also show the constructional details of inserting pin 136, which is provided with a V-groove 144 for capturing and directing wire portion WP between upper enlarged portion 137' and surface 142 of guide bar 126a. In FIG. 16, portion WP is also shown as it would appear captured in V-groove 144.

Slit 143 present in inserting pin 136 is capable of receiving anchoring device 134 when the inserting pin is in a lower most position after descent, as shown in FIG. 15. In this way, V-groove 144 may direct wire portion WP down beyond upper enlarged portion 137' to trap wire portion WP under upper enlarged portion 137' (see also FIG. 16).

Once the coils are completed on insertion tool 125, and wire leads $I_1$, $I_2$, $I_3$, $F_1$, $F_2$ have been anchored to the required guide bars 126, as described hereinabove, a wire gripper such as wire gripper 124 shown in FIG. 1 may grasp the wire portions such as wire portion WP just beside where it is placed in anchoring devices like anchoring device 134. Then, the wire gripper may move radially outward in relation to centre 125' of insertion tool 125 in order to withdraw any remaining portion which is buried under the coils. Furthermore, wire gripper may place the grasped wire lead in an anchoring pocket around the stator core, so that the wire leads are ready for successive wire manipulation to completely terminate the stator core.

Alternatively, a wire gripper like 124 may grasp the wire portions like WP, placed in the anchoring device like 134, only after the coils have been inserted in the stator core. This may be done in the same way that has been described previously for withdrawing portions of such wire leads which are buried under the coils. Again, the wire leads may be placed in anchoring pockets for successive wire manipulation to route the wire lead on a trajectory like 109, or the wire leads may be immediately coursed on trajectories like 109 using a wire gripper like 124.

In accordance with the present invention, improved solutions for forming initial leads like $I_1$-$I_3$ and final leads like $F_1$-$F_3$ are provided. In addition, the present invention relates to achieving anchoring of portions of these same leads to respective guide blades of an insertion tool.

In some embodiments of the present invention, it is possible to reduce the number of apparatus members required to form and anchor leads $I_1$-$I_3$ and $F_1$-$F_3$ to the guide blades, and to reduce the time required for performing the related operations.

Figure 17:
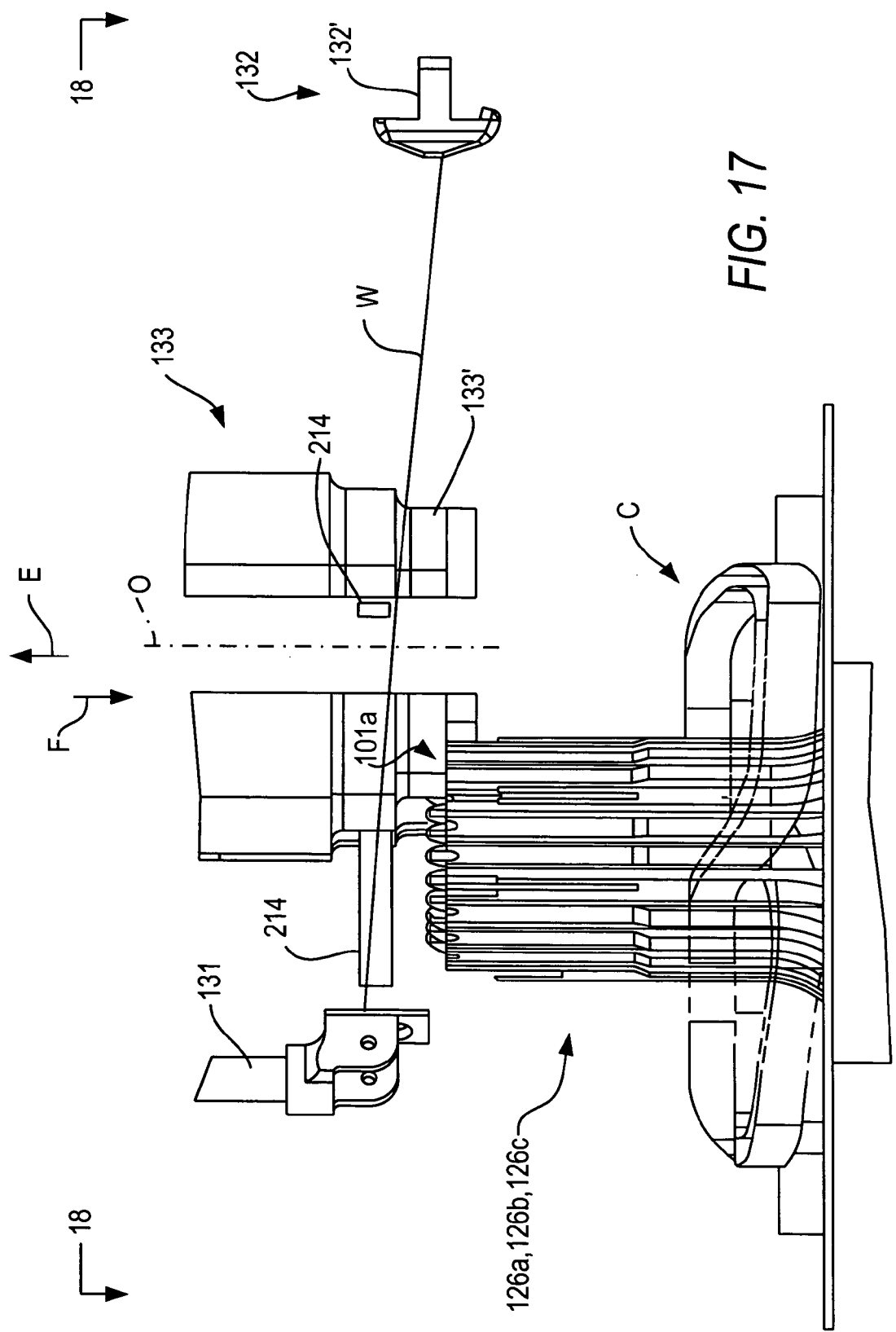
FIG. 17 is a general elevational view of main apparatus members required for accomplishing the principles of one embodiment of the present invention.

FIG. 17 shows flyer arm 131 capable of rotating around axis O to dispense and wind wire W around template 133 in order to form coils like C. (It should be noted that coil C is a schematic view of a coil, and portions of it are shown as transparent in the FIG. merely for simplicity.) Coils like C are shown deposited on insertion tool and around guide blades like 126a, 126b, 126c, etc. The assembly unit for causing rotation of flyer arm 131 has been omitted for sake of clarity. However, such an assembly unit should be considered as being conventional.

Template 133 has step 133' that is aligned with certain insertion guides in order to deliver turns of coils C to the insertion tool. Template 133 is capable of being raised and lowered in directions E and F, respectively, in accordance with the present invention. Similarly, stripping members 214 are capable of being raised and lowered in directions E and F, respectively. Again, assembly units for lowering and raising template 133 and stripping members 214 have been omitted for sake of clarity. However, they should be considered as being conventional.

Figure 19:
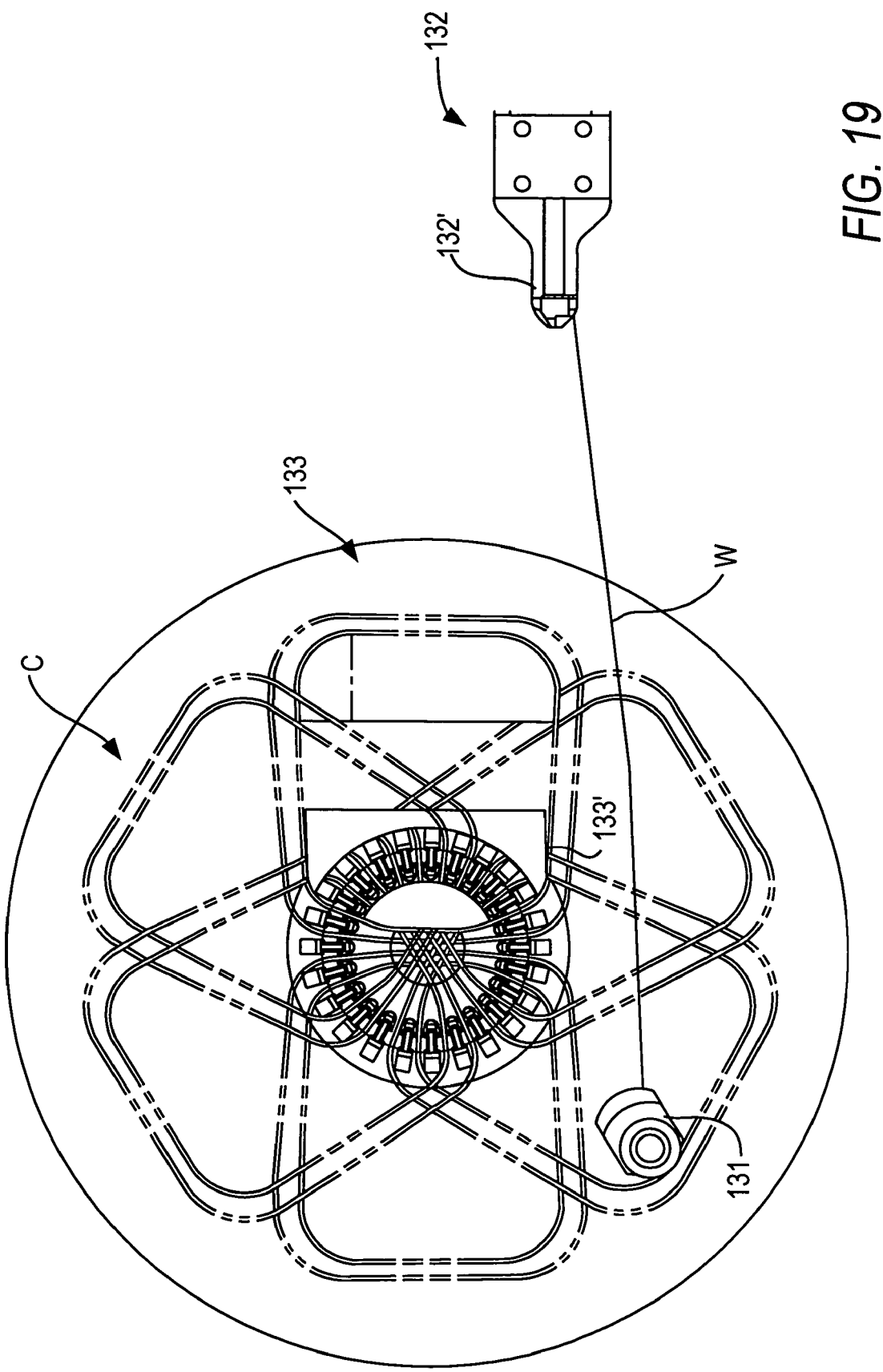
FIG. 19 is a partial view from direction 18-18 of FIG. 17, although with certain parts omitted for reasons of clarity.

Lead pull 132 is shown partially represented in FIG. 17, and more fully represented in FIG. 19. Lead pull 132 is capable of gripping and holding wire W with gripper portions 132'. In addition, lead pull 132 is capable of moving to any required position with respect to flyer arm 131 in order to transfer and align a portion of wire W which it is gripping. Lead pull 132 and the assembly unit for moving it may be similar to the apparatus described, for example, in Luciani et al. U.S. Pat. No. 5,065,503, incorporated by reference hereinabove. Furthermore, lead pull 132 may be provided with wire cutters and wire inserting devices such as those described in Luciani et al. U.S. Pat. No. 5,065,503.

Figure 18:
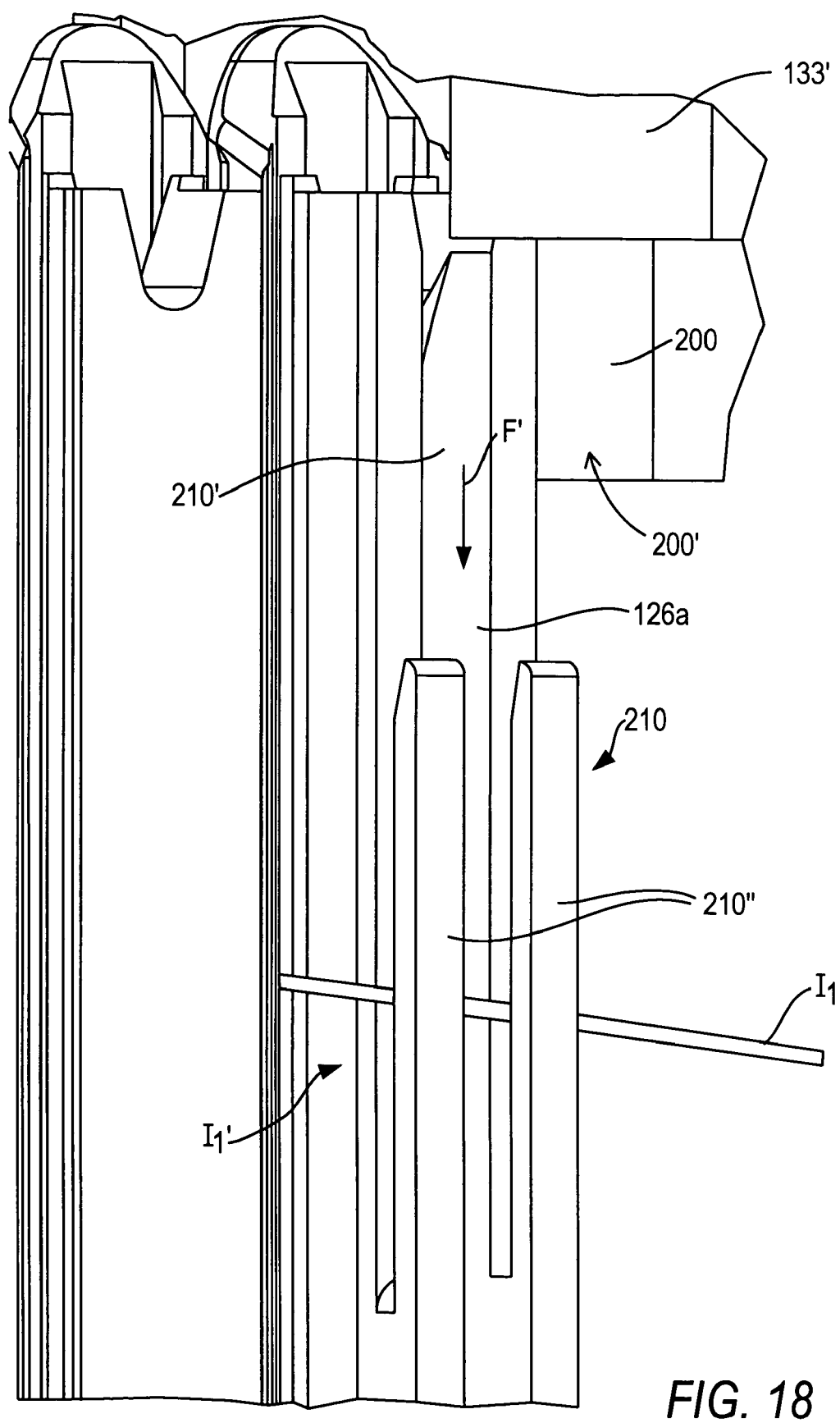
FIG. 18 is an enlarged perspective view of area 101a of FIG. 17.

Certain guide blades like 126a are provided with lead anchoring trough 210 in the form of upright columns 210", as is more fully shown in FIG. 18 (which is an enlargement of area 101a of FIG. 17). In FIG. 18, a lead portion $I_1$ is shown inserted behind upright columns 210" and against a blade like 126a by moving the lead portion in the direction F' (parallel to direction F). Releasable catches (not shown) may be present to avoid unwanted removal of the leads from behind upright columns 210". These anchoring portions may be also like members 134 described hereinabove in connection with the embodiment shown in FIG. 15.

FIGS. 20, 22, 24, 25, 26 and 28 are views like that of FIG. 17 to show the apparatus members in various stages of operation according to an embodiment of the invention. In these FIGS. certain parts of the apparatus members have been omitted with respect to FIG. 17 for reasons of clarity.

Figure 20:
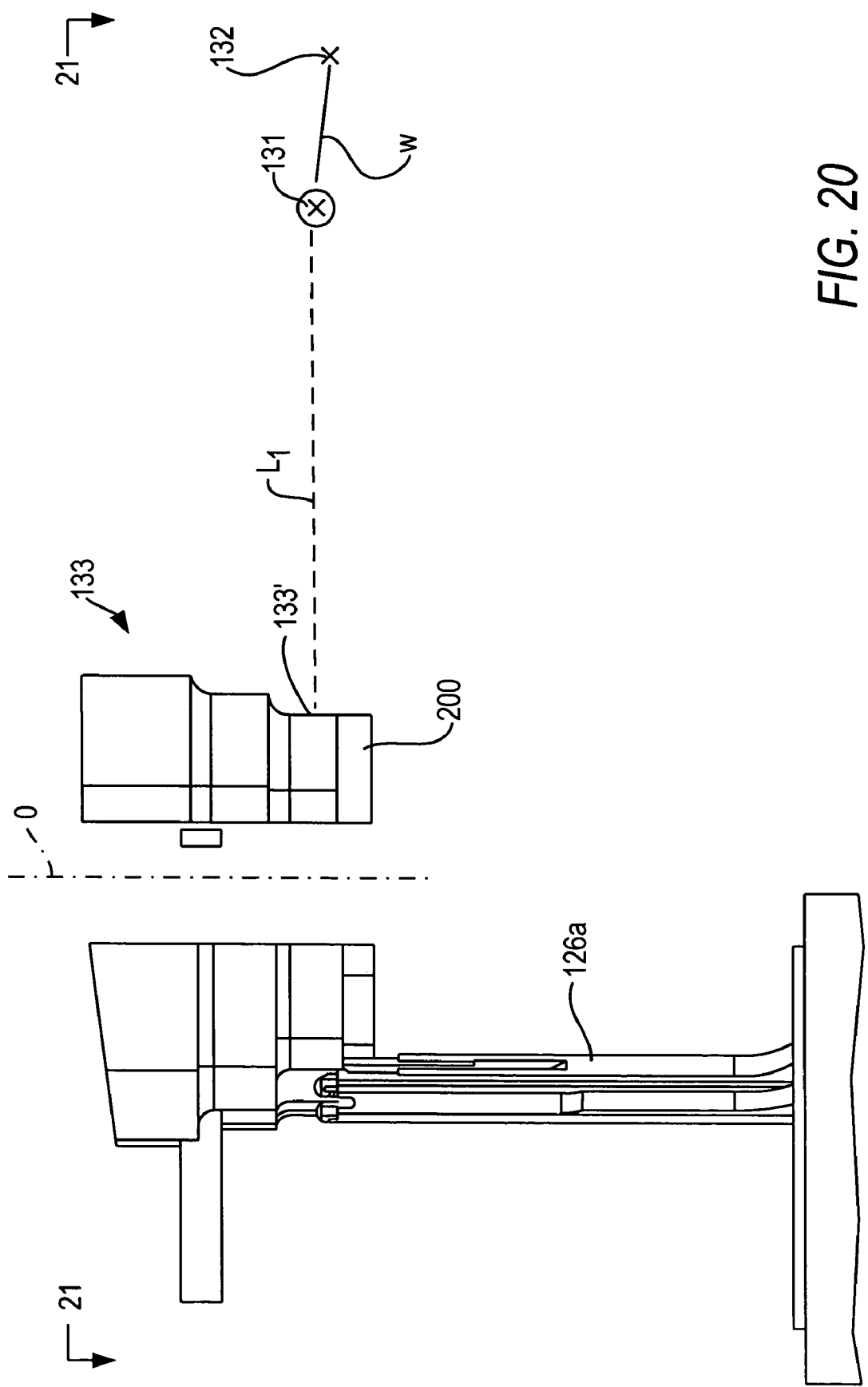
FIG. 20 is a view similar to FIG. 17, although showing a different operational sequence according to the principles of the present invention.
Figure 21:
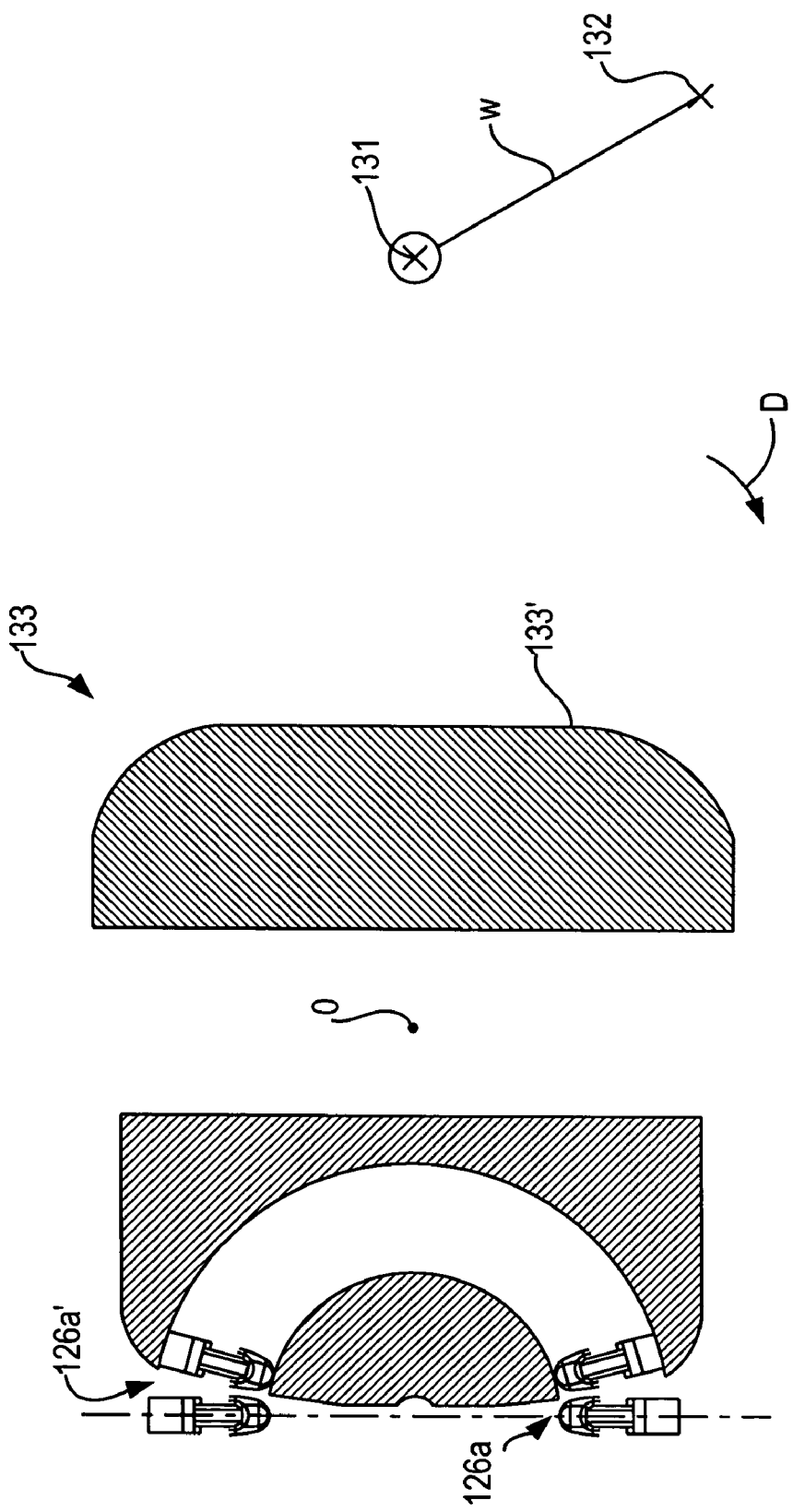
FIG. 21 is a view from direction 21-21 of FIG. 20 without showing certain parts of FIG. 20 for reasons of clarity.
Figure 22:
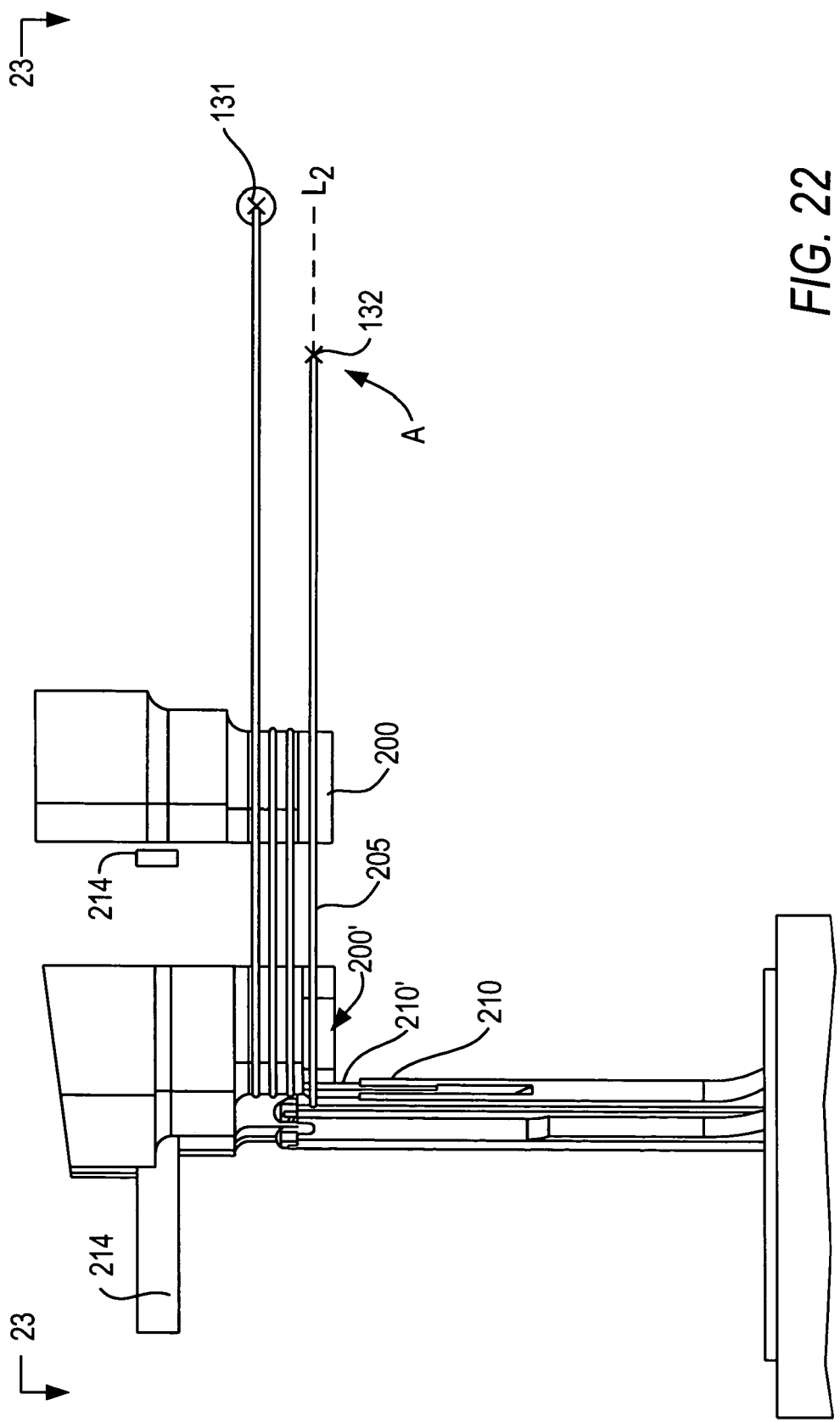
FIG. 22 is a view similar to FIG. 17, although showing a different operational sequence according to the principles of the present invention.
Figure 23:
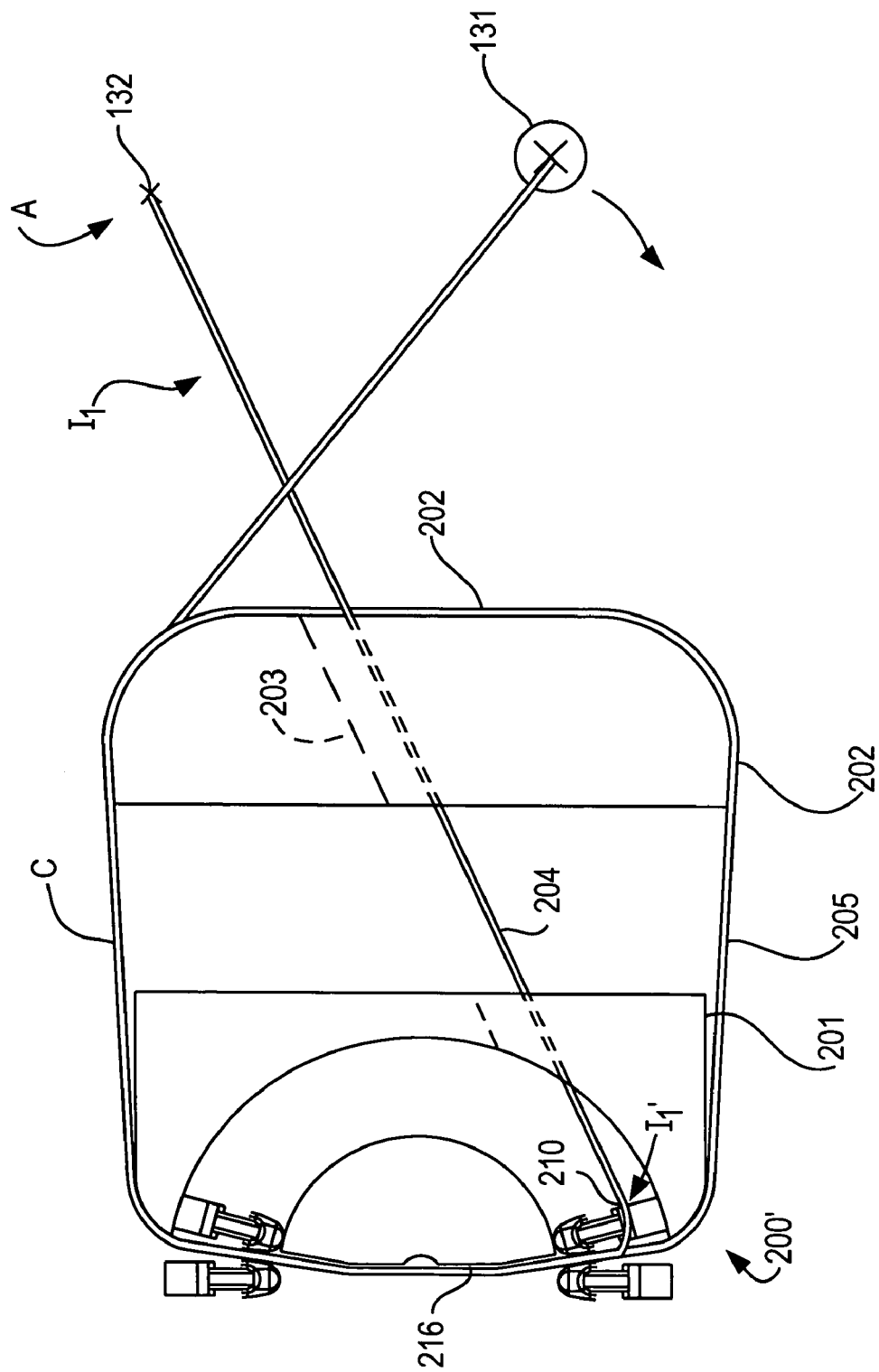
FIG. 23 is a view from direction 23-23 of FIG. 22 without showing certain parts of FIG. 22 for reasons of clarity.
Figure 27:
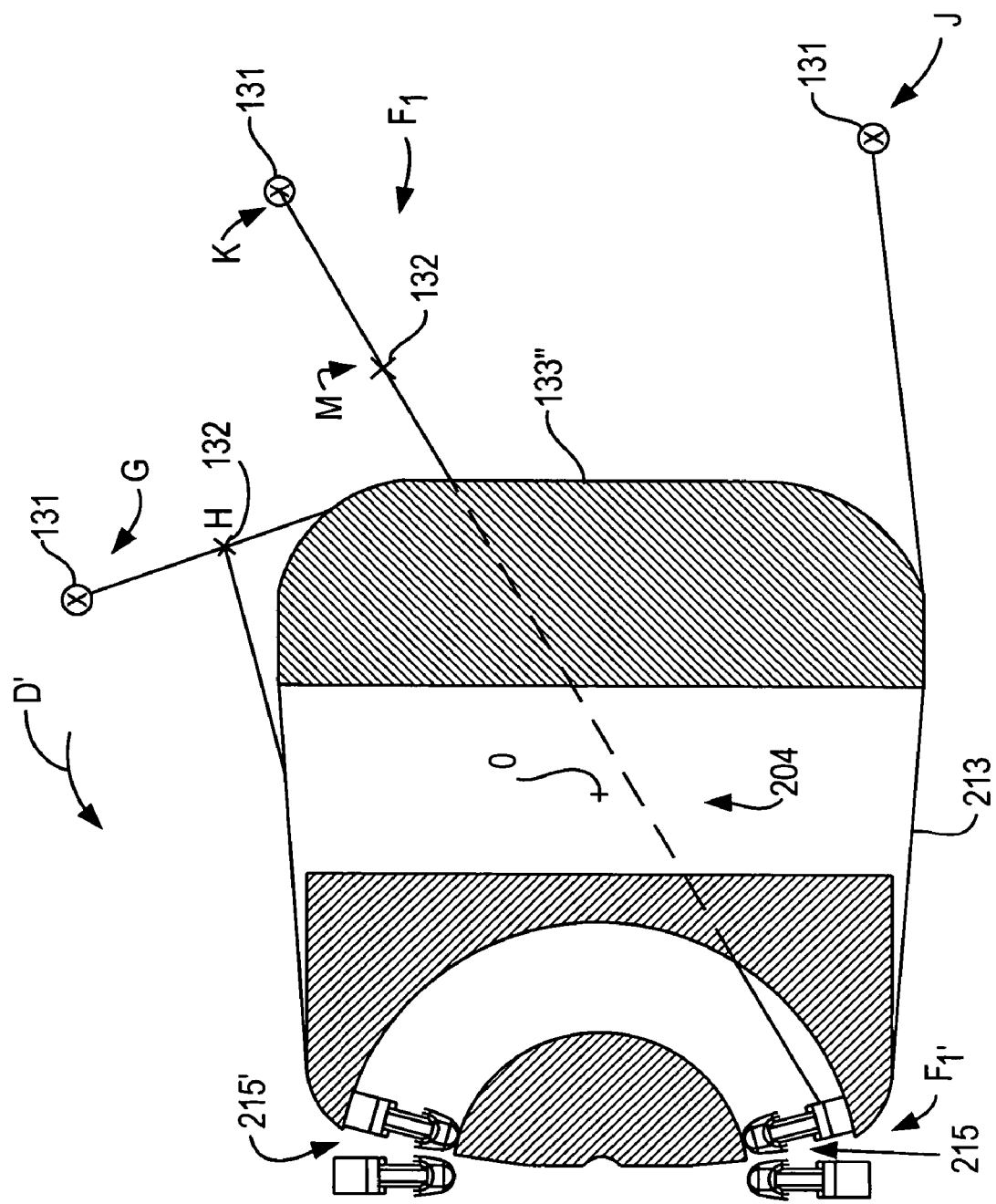
FIG. 27 is a view from direction 27-27 of FIG. 26 without showing certain parts of FIG. 26 for clarity.
Figure 28:
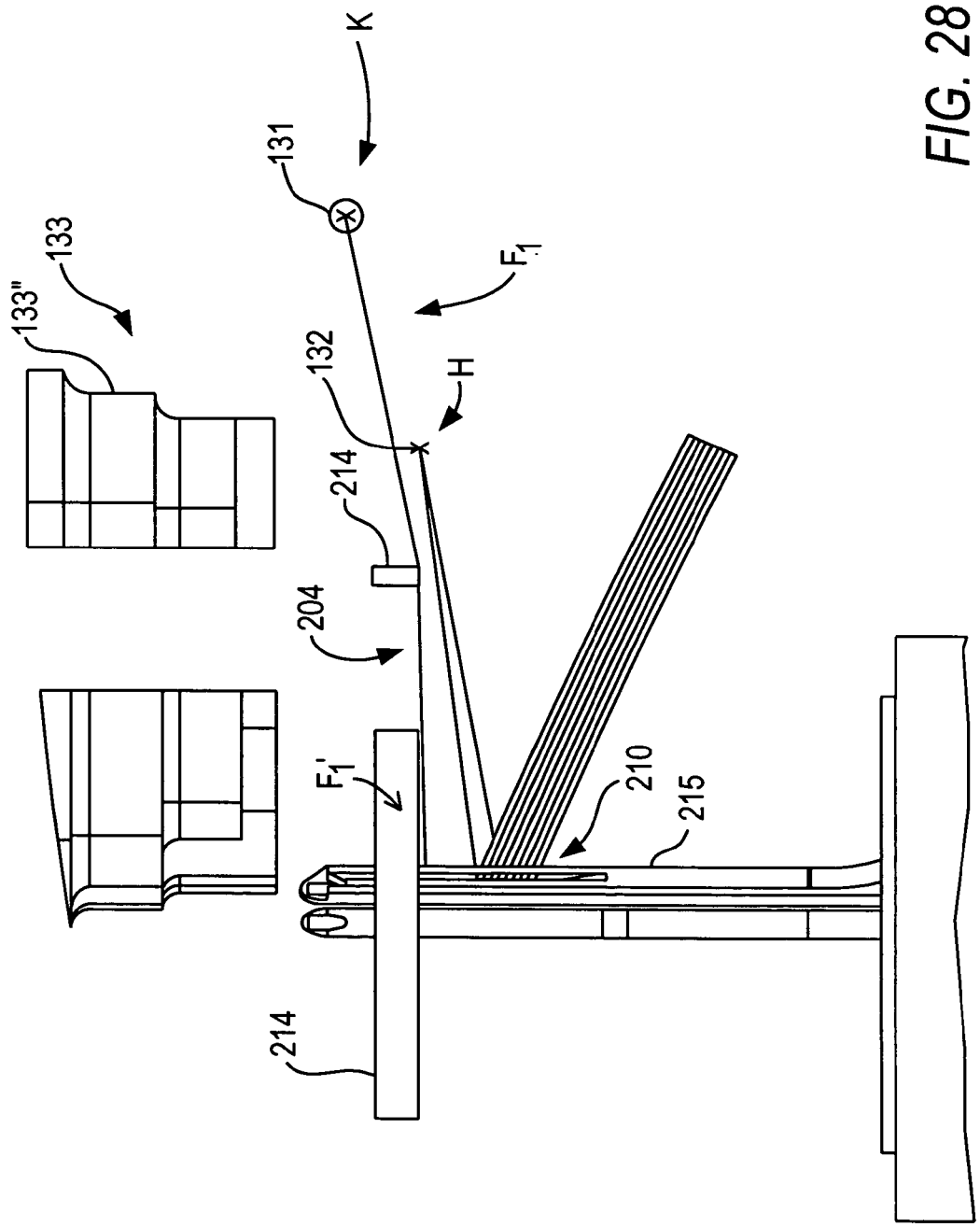
FIG. 28 is a view similar to FIG. 17, although showing a different operational sequence according to the principles of the present invention.

FIGS. 21, 23 and 27 are views like that of FIG. 19 to show the apparatus members in corresponding stages of operation. More particularly, FIG. 21 is a view from direction 21-21 of FIG. 20, FIG. 23 is a view from direction 23-23 of FIG. 22, and FIG. 27 is a view from direction 27-27 of FIG. 26. Also in FIGS. 21, 23 and 27, certain parts of the apparatus members have been omitted for reasons of clarity. For example stripping members 214 have been omitted in FIGS. 21, 23, and 27.

For reasons of clarity and simplification, FIG. 27 is showing various stages of operation, as will be more fully described hereinbelow.

In all the FIGS. showing the stages of operation, the wire dispensing point of flyer arm 131 has been shown schematically as a circled X, while the wire gripping portion of lead pull 132 has been shown schematically as an X.

FIGS. 20-25 show a sequence of operations for forming an initial lead like one of leads $I_1$-$I_3$, and anchoring it to a respective guide blade in order to achieve the previously mentioned scope. It should be appreciated that similar operations can be accomplished for forming and anchoring of any other of the initial leads to a respective guide blade.

The rest conditions of apparatus of the present invention in order to start winding of a coil and forming of an initial lead like $I_1$ are shown in FIGS. 20 and 21. Here, wire W extends from flyer arm 131 to lead pull 132, which is temporarily holding an end portion of the same wire W. At the same time, template 133 is in a lowered and centered position that brings step 133' of template 133 into angular alignment with guide blade 126a and further guide blade 126a' (see, for example, FIG. 21). The resulting coil C will need to span around blades 126a and 126a', as has been described hereinabove in connection with FIGS. 1-14. Coil C is wound by rotating flyer arm 131 around center O of template 133 in a chosen clockwise or counterclockwise direction (clockwise direction D for the purpose of this disclosure) for a predetermined number of turns. As shown in FIG. 20, template 133 has been lowered to level $L_1$, which aligns flyer arm 131 with step 133' where tensioned wire W will be wound around the template due to the rotation of the flyer arm in direction D.

In accordance with the present invention, flyer arm 131 may start to rotate around template 133 and proceed to form the predetermined number of turns of the coils, while lead pull 132 holds the end portion of initial lead $I_1$. A first angular portion of rotation of flyer arm 131 around template 133 forms the rest of initial lead $I_1$, which initially remains around and tensioned against step 133' (see extension 205 of FIG. 22).

Prior to finishing winding of the coil, lead pull 132, which is holding the end portion of lead $I_1$, is caused to move to position A (see FIGS. 22 and 23), and if needed, slightly lowered to level $L_2$. The consequence of this is that initial lead $I_1$, extending from front potion 216 of template 133, becomes bent around and in contact with guide blade 126a in order to reach lead pull 132 along inclined extension 204. Furthermore, portion $I_1$' of initial lead $I_1$, which is just beyond the bend around guide blade 126a, and towards lead pull 132, results in a positioning that is aligned over anchoring trough 210.

This movement of lead pull 132 to reach position A is possible because template 133 includes an open seat 200 on its underside. As shown particularly in FIG. 23, initial lead $I_1$ becomes directed along extension 204 which is within seat 200. Without seat 200 on template 133, when moving lead pull 132 to position A, initial lead $I_1$ would remain against step 133' (i.e., along extension 205). Preferably, seat 200 is carved out of template 133 by removing faces 201 and 202, together with the posterior material up to plane 203.

Plane 203 may be substantially parallel to the direction which extension 204 is required to have to align portion $I_1$' with anchoring trough 210. In other words, initial lead $I_1$ passes from having extension 205 around template 133 to having extension 204, as shown in FIG. 23. To achieve this, lead pull 132 may be moved to position A along a programmed spatial path which ensures that the transition from extension 205 to extension 204 of initial lead $I_1$ occurs without losing tension on the wire or alignment with anchoring trough 210. As described hereinabove, reaching extension 204 bends initial portion $I_1$ around guide blade 126a so that alignment with anchoring trough 210 is achieved. Contact of initial lead $I_1$ with guide blade 126a occurs because seat 200 exposes top portion 210' of guide blade 126a, as shown in FIGS. 18 and 22. In fact, seat 200 includes carving out corner 200' of the template. Once extension 204 is reached, initial portion $I_1$ may be inserted in anchoring trough 210 by moving lead pull 132 to level $L_3$ (see FIG. 24, showing portion $I_1$' inserted in trough 210 and stripping members 214 lowered after having finished winding of coil C).

The previously described movement of lead pull 132 to extend initial lead $I_1$ along extension 204 and to insert it into anchoring trough 210 may occur while flyer arm 131 is rotating to wind coil C on step 133', thereby saving cycle time of the general apparatus. This is possible because all the aforementioned movements of lead pull 132 occur out of areas that would bring it into collision with rotating flyer arm 131. For example, lead pull 132 accomplishes all the described movements in area 212, which is below the plane containing the orbit of flyer arm 131.

Figure 24:
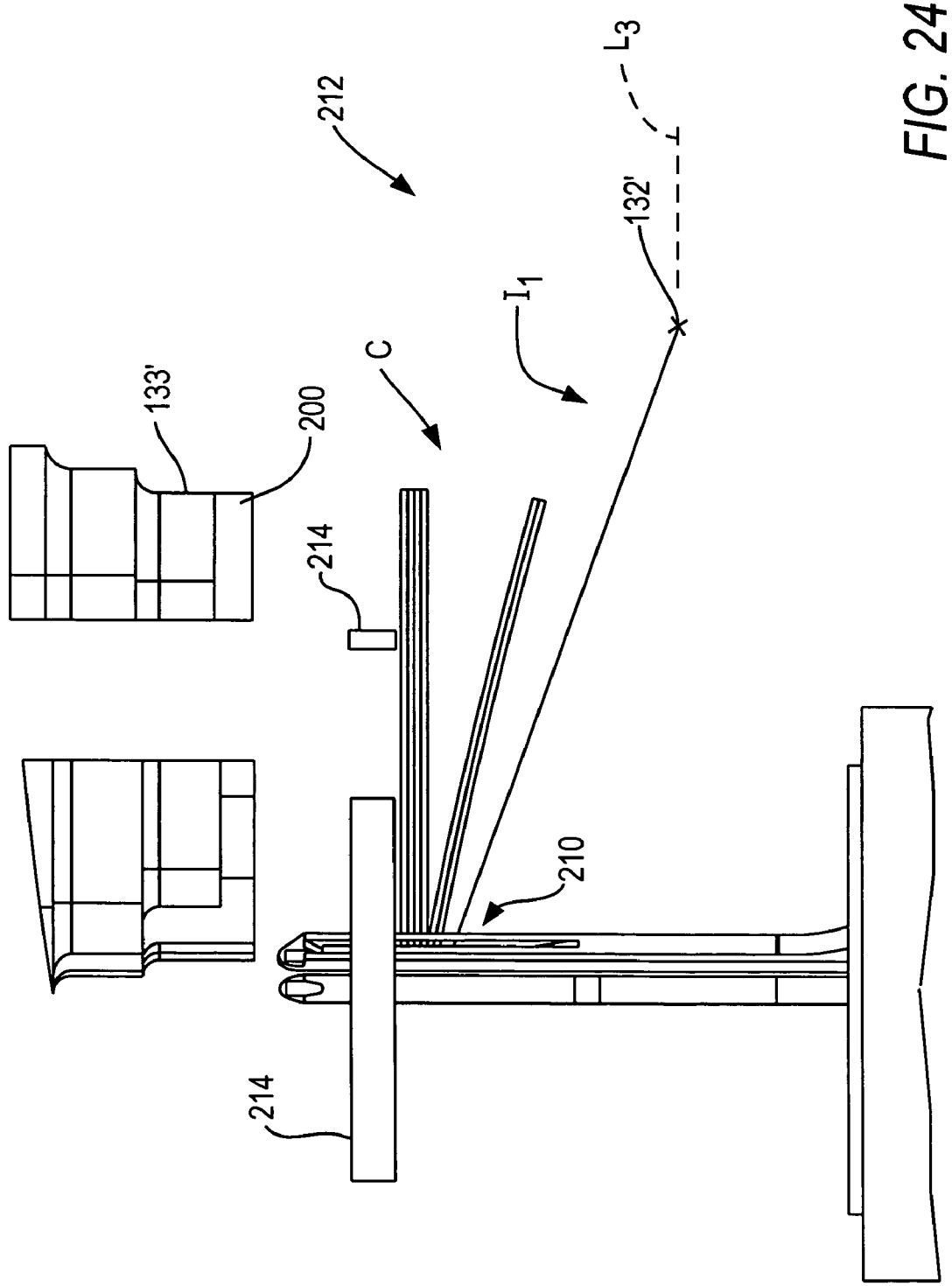
FIG. 24 is a view similar to FIG. 17, although showing a different operational sequence according to the principles of the present invention.
Figure 25:
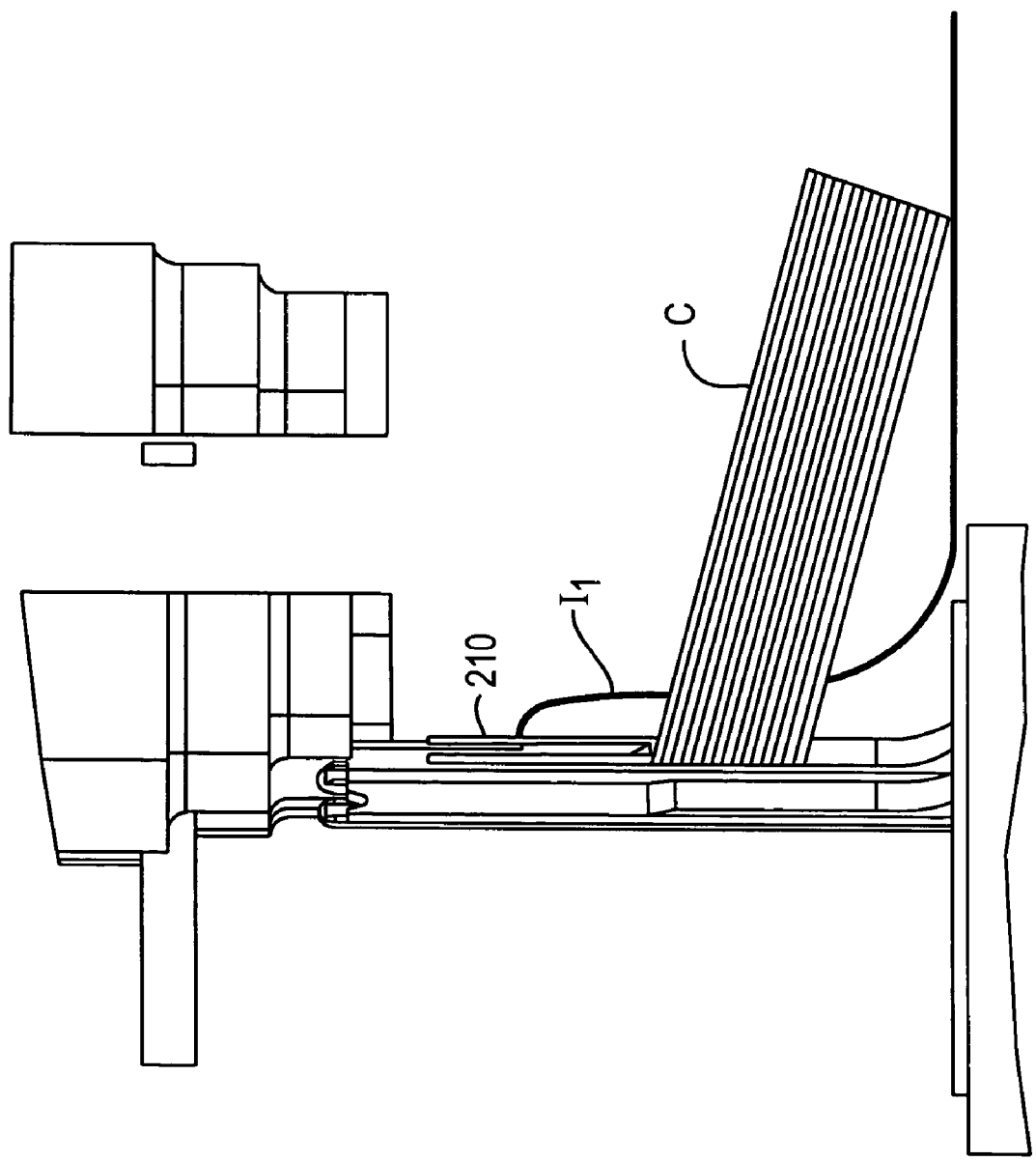
FIG. 25 is a view similar to FIG. 17, although showing a different operational sequence according to the principles of the present invention.
Figure 26:
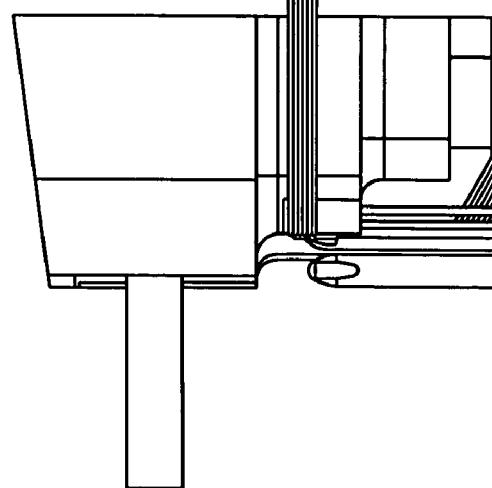
FIG. 26 is a view similar to FIG. 17, although showing a different operational sequence according to the principles of the present invention.

Once flyer arm 131 has finished winding the predetermined number of turns which form coil C, any turns which still remain on step 133' may be stripped off template 133 by lowering stripping members 214 (see FIG. 24). The end result of the previously described operations is shown in FIG. 25, where initial lead $I_1$ is shown anchored in anchoring trough 210 and coil C is in a finished condition of positioning on the insertion tool.

A final lead like $F_1$ may be formed and anchored to an anchoring trough 210 of a guide blade like 215 (see FIGS. 26-28) by operating as follows.

When flyer arm 131 is rotating to form a final coil on larger step 133" (see, in particular, FIG. 27, because in FIG. 26 flyer arm 131 and lead pull 132 are hidden by template 133 by the first operation stages described with reference to FIG. 27), for example, by counterclockwise rotation D', and during rotation of the flyer arm to form the last turn, flyer arm 131 may be stopped in position G (i.e., in a position which is before the flyer arm winds the portion of the final lead which needs to be anchored on guide blade 215). At this point, lead pull 132 may grip wire W at point H, which is near template 133 and on the wire stretch between template 133 and flyer arm 131. Then, flyer arm 131 may continue its rotation in the counterclockwise direction to reach point J (see FIG. 27). In this way, extension 213 of the final lead portion has been formed against step 133". Extension 213 has portion $F_1'$ which needs to be inserted in anchoring trough 210 of guide blade 215. During rotation of flyer arm 131 to point J, lead pull 132 maintains a firm hold on wire W at point H, so that wire W going from lead pull 132 to flyer arm 131 is maintained in tensioned against step 133" of the template (a conventional wire tensioning device—not shown—may tension wire W in its path to reach the dispensing portion of the flyer arm). Then, stripping members 214 may be lowered to run any previously wound turns remaining on step 133" and extension 213 onto the top portions of guide blades 215 and 215'. Immediately afterwards, template 133 and stripping members 214 may be raised to be out of the way.

Once template 133 and stripping members 214 are out of the way, flyer arm 131 may rotate to position K in order to bend final lead $F_1$ against the top portion of guide blade 215 and align it along extension 204 (see FIG. 27). In this way, portion $F_1'$ is aligned with anchoring trough 210 of guide blade 215. Then, stripping members 214 and lead pull 132 may be lowered to insert portion $F_1'$ into anchoring trough 210 (see FIGS. 27 and 28). Finally, lead pull 132 may release wire W at position H and move to position M, where it can grip and cut wire W in order to free final coil C (see FIG. 27). Alternatively, after gripping at position M by lead pull 132, flyer arm 131 may accomplish further rotation to lengthen final lead $F_1$. Once flyer arm 131 has done this and is stationary, lead pull 132 may move to grip and cut the wire adjacent to the flyer arm.

Figure 29:
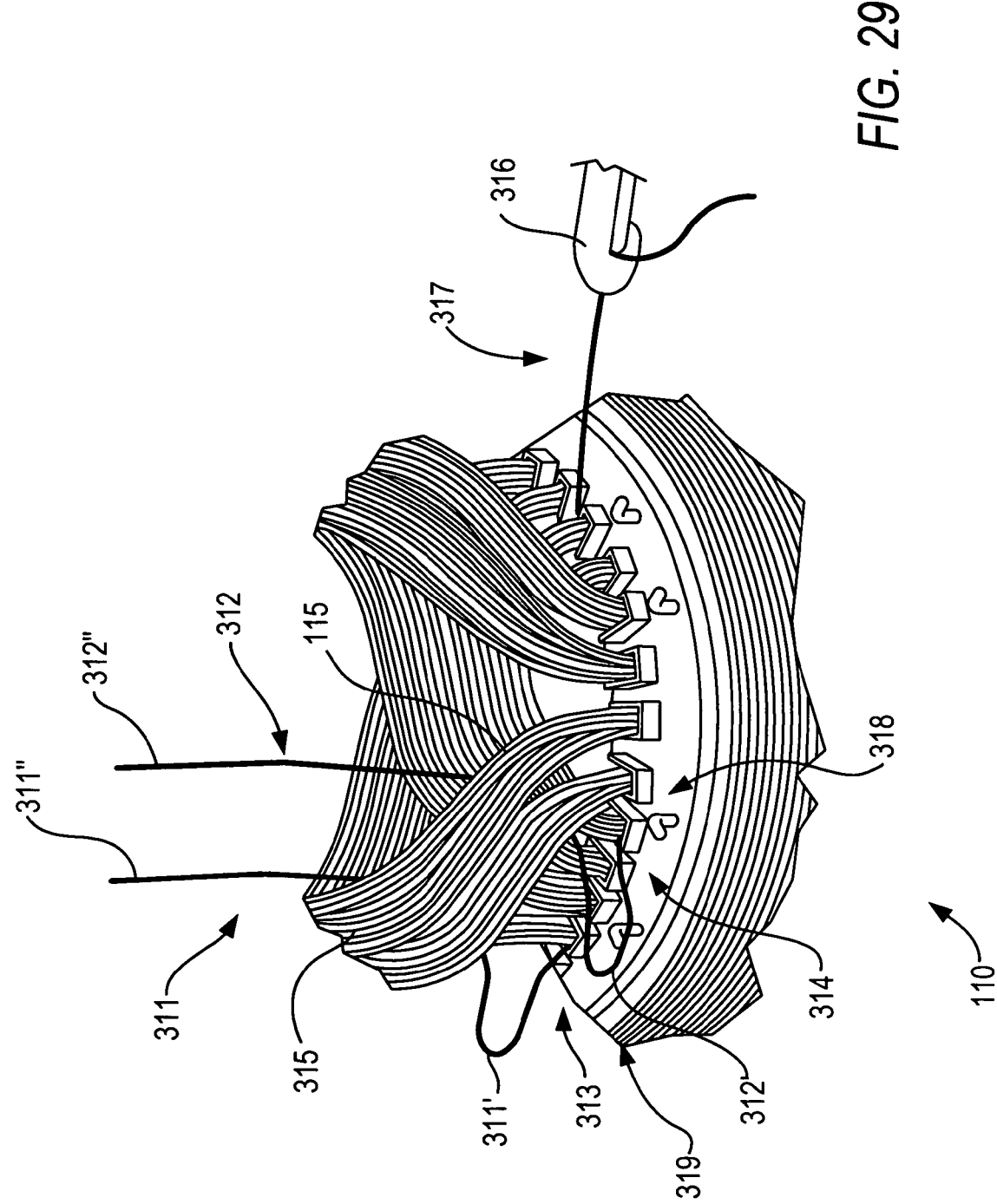
FIG. 29 is a partial perspective view of a wound stator core having wire leads formed as a result of applying the principles of the present invention.
Figure 30:
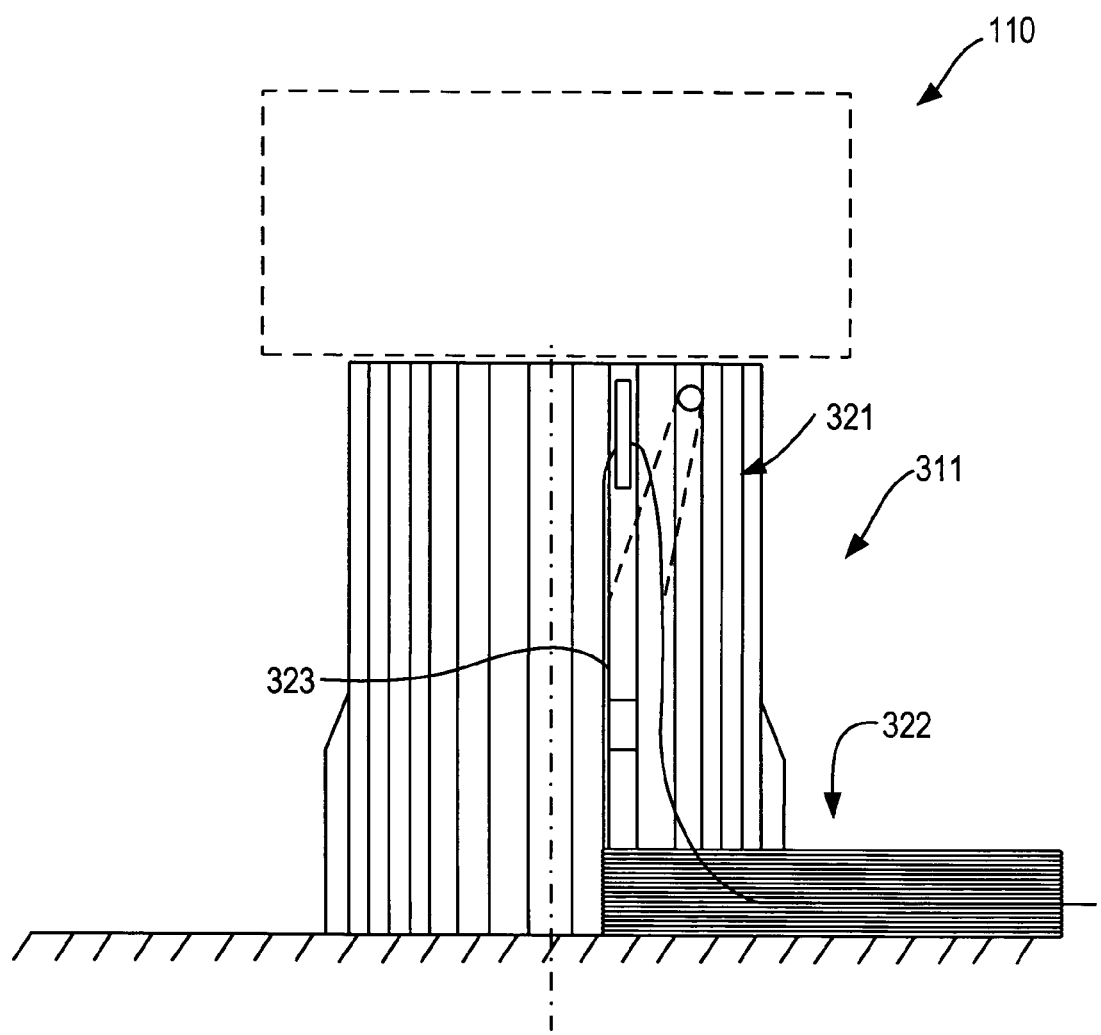
FIG. 30 is a schematic view showing the insertion tool with a wire lead that has been prepared according to the principles of the present invention anchored in a guide bar of the insertion tool.

FIGS. 29 and 30 illustrate additional embodiments of apparatus and methods for wire coil lead placement in accordance with the present invention.

FIG. 29 is a partial perspective view of a wound stator core 110 having wire leads 311 and 312 formed as a result of applying the principles of the present invention. (FIG. 29 is a view similar to FIG. 1, described hereinabove.)

Wire leads 311 and 312 include loop portions 311' and 312' that depart from the slots of stator core 110 (see departure point 313 for wire lead 311 and departure point 314 for lead 312). The loop portions extend to portions buried under coils 315. In turn, the buried portions extend to unburied end portions 311" and 312".

In this way, wire leads 311 and 312 are positioned in predetermined positions with respect to stator core 110 and anchored by the resistance that coils 315 exert on the buried portions. This is a condition necessary for a wire manipulator to be able to grasp wire leads 311 and 312.

In accordance with the present invention, loop portions 311' and 312' may be grasped by a first wire manipulator 316, which may then move in relation to stator core 110 to pull wire leads 311 and 312 out from being under coils 315 (i.e., completely withdraw the wire leads from being buried under the coils—see the illustrated conditions of wire lead 317, which has been withdrawn from being buried under the coils, by movements of first wire manipulator 316). Once the wire leads are in the condition shown for wire lead 317, they are free to be routed around stator core 110.

A second wire manipulator (not shown) may be present to hold the wire leads near points 313 and 314, when first wire manipulator 316 is pulling the wire leads to withdraw them from being buried under coils 315. Holding the wire leads near points 313 and 314 with the second wire manipulator, when first wire manipulator 316 is pulling the wire leads, prevents the wire leads from being drawn out of the slots from where they depart. Furthermore, the second wire manipulator may be used to route the wire leads around stator core 110, once they have been withdrawn by the first wire manipulator 316. Also, the second wire manipulator may have a sliding grasp on the wire leads during movement to route the wire leads around stator core 110.

The methods described hereinabove in connection with FIGS. 1-14 may be applied to achieve that wire leads 311 and 312 have their departure points 313 and 314 near to the outer portions of slots 318 and 319 of stator core 110, as shown in FIG. 29.

FIG. 30 shows the insertion tool with a wire lead such as wire lead 311 that has been prepared according to the principles of the present invention anchored in guide bar 323 of the insertion tool. Other coils present on the insertion tool for the insertion operation have been omitted, for sake of clarity.

For carrying out the insertion operation, stator core 110 (shown with dashed line representation in FIG. 30) is overhead and aligned with the insertion tool. Prior to the insertion operation, loop portions such as portion 311' may be formed by removing lead 311 from being anchored on the guide bar and moving its portion 321 to an outward position, as shown by the dashed line representation 321 in FIG. 30. At the same time, portion 322 remains buried under the coils placed at the base of the insertion tool. These principles may apply to form loop portions such as 311' and 312' for any other wire leads that need to be present on the stator core.

Once all the coils are placed on the insertion tool and the wire leads have been prepared in the manner that has been described for wire lead 311, insertion of the coils may occur by means of the ram operations of the insertion machinery, so that portion 321 will result in becoming like loop portion 311' shown in FIG. 29, and portion 322 will result in becoming the portion-buried under the coils, as shown in FIG. 29.

It will be understood that the foregoing is only illustrative of the principles of the present invention, and that still other modifications can be made by those skilled in the art without departing from the scope and spirit of the invention.

What is claimed is:

1. A method for forming wire leads that depart from wire coils inserted into slots of a dynamo-electric machine component comprising:

receiving a plurality of wire coils on an insertion tool; and anchoring a wire lead at a location on an anchoring device disposed on a guide bar of the insertion tool, wherein a wire coil corresponding to the wire lead encircles the location of the insertion tool when the wire coil is viewed from a direction perpendicular to a plane of the insertion tool that receives the wire coil, wherein the wire coil is one of the plurality of wire coils, wherein none of the plurality of wire coils surmount a first end portion of the wire lead anchored at the location, and wherein the anchoring device is axially spaced with respect to a central axis of the insertion tool from a position of the wire coil corresponding to the wire lead on the insertion tool.

2. The method of claim 1 wherein the guide bar is configured to route the wire coil corresponding to the wire lead.

3. The method of claim 2 further comprising:
inserting the wire lead into the anchoring device using an insertion pin configured to exit from a template for forming the plurality of wire coils.

4. The method of claim 1 further comprising:
grasping the first end portion of the wire lead anchored at the location; and
moving the wire lead radially outward with respect to a central axis of the insertion tool to withdraw a second portion of the wire lead buried beneath the plurality of wire coils.

5. The method of claim 1 further comprising:
inserting the plurality of wire coils into the slots of the machine component;
grasping the first end portion of the wire lead anchored at the location; and
withdrawing a second portion of the wire lead buried beneath the plurality of wire coils.

6. The method of claim 1 further comprising:
inserting the plurality of wire coils into the slots of the machine component; and
disposing the wire lead at an outer circumference of the machine component such that the first end portion of the wire lead is not surmounted by any of the plurality of wire coils.

7. The method of claim 1 further comprising:
raising a wire portion adjacent to the first end portion of the wire lead above the insertion tool to enable a wire winding means to form the wire coil corresponding to the wire lead.

8. The method of claim 1 further comprising:
disposing the wire lead against a plane of a template for forming the plurality of wire coils, the plane of the template being parallel to an extension of the anchoring device configured to receive the wire lead; and
anchoring the wire lead within the extension.

9. The method of claim 1 further comprising:
forming the first end portion of the wire lead into a wire loop;
grasping the wire loop; and
moving the wire loop radially outward with respect to a central axis of the insertion tool.

10. The method of claim 9 further comprising:
inserting the plurality of wire coils into the machine component;
grasping the wire lead at a departure point where the wire lead departs from the machine component; and
gripping the wire loop to withdraw a second portion of the wire lead buried beneath the plurality of wire coils.

11. The method of claim 1 further comprising:
winding the wire coil corresponding to the wire lead on a template, wherein the template comprises a seat portion on the underside of the template.

12. The method of claim 11, wherein the wire lead is an initial wire lead, the method further comprising:
extending the initial wire lead within the seat portion such that the wire lead is aligned with the anchoring location on the insertion tool.

13. The method of claim 12, wherein the winding the wire coil corresponding to the wire lead on the template further comprises holding an end portion of the initial wire lead with a lead pull member, the method further comprising:
inserting the initial wire lead into the anchoring device using the lead pull member.

14. The method of claim 12, wherein the extending the initial wire lead occurs at the same time as the winding of the wire coil on the template.

15. The method of claim 11, wherein the wire lead is a final wire lead, the method further comprising:
prior to winding the portion of the final wire lead that will be anchored to the insertion tool, gripping the wire of the wire coil;
winding on the template the portion of the wire that will be anchored to the insertion tool, wherein the wire is maintained in tension against the template;
extending the final wire lead within the seat portion such that the wire lead is aligned with the anchoring location on the insertion tool.

16. The method of claim 15 further comprising:
inserting the final wire lead into the anchoring device using one or more stripping members that are associated with the template.

* * * * *